(12) United States Patent
Kondou et al.

(10) Patent No.: US 9,229,820 B2
(45) Date of Patent: Jan. 5, 2016

(54) INFORMATION PROCESSING DEVICE WITH MEMORY DUMP FUNCTION, MEMORY DUMP METHOD, AND RECORDING MEDIUM

(71) Applicant: FUJITSU LIMITED, Kawasaki-shi, Kanagawa (JP)

(72) Inventors: Hiroshi Kondou, Yokohama (JP); Kenji Okano, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 143 days.

(21) Appl. No.: 13/902,849

(22) Filed: May 26, 2013

(65) Prior Publication Data
US 2013/0346369 A1   Dec. 26, 2013

(30) Foreign Application Priority Data
Jun. 22, 2012   (JP) ................................. 2012-141495

(51) Int. Cl.
*G06F 11/30*   (2006.01)
*G06F 11/14*   (2006.01)
*G06F 11/07*   (2006.01)

(52) U.S. Cl.
CPC ........ *G06F 11/1458* (2013.01); *G06F 11/0712* (2013.01); *G06F 11/0778* (2013.01)

(58) Field of Classification Search
CPC ............ G06F 11/0793; G06F 11/0778; G06F 11/1438
USPC .......................................... 714/23, 24, 38.11
See application file for complete search history.

(56) References Cited

U.S. PATENT DOCUMENTS

| 6,189,111 | B1 | 2/2001 | Alexander et al. |
| 7,464,378 | B1 | 12/2008 | Limaye et al. |
| 7,698,390 | B1 | 4/2010 | Harkness et al. |
| 7,877,358 | B2 | 1/2011 | Ritz et al. |
| 8,069,218 | B1 | 11/2011 | Tormasov et al. |

(Continued)

FOREIGN PATENT DOCUMENTS

| EP | 1341085 A2 | 9/2003 |
| EP | 1638000 A2 | 3/2006 |

(Continued)

OTHER PUBLICATIONS

Extended European Search Report dated Jun. 6, 2014 for the corresponding European Patent Application No. 13169691.6, 8 pages.

(Continued)

*Primary Examiner* — Chae Ko
(74) *Attorney, Agent, or Firm* — Fujitsu Patent Center

(57) ABSTRACT

An information processing device, including: a memory; a processing unit which operates a virtual machine, an operating system which is executed on the virtual machine, and a hypervisor which controls the virtual machine; and a control unit which controls a system including the memory and the processor. The processing unit stops the operating system when detecting an error of the hypervisor, notifies the control unit of a first memory area used by the hypervisor, stops the hypervisor, changes a memory area used by the hypervisor into a second memory area different from the first memory area notified by the control unit, starts the hypervisor using the second memory area as an available area, starts the operating system, and reads data in the first memory area, and writes the data to a file as a dump file of the hypervisor.

15 Claims, 24 Drawing Sheets

(56) References Cited

U.S. PATENT DOCUMENTS

| | | | |
|---|---|---|---|
| 8,086,906 B2 | 12/2011 | Ritz et al. | |
| 2003/0163744 A1 | 8/2003 | Yamazaki | |
| 2004/0221036 A1 | 11/2004 | Smith | |
| 2006/0069944 A1 | 3/2006 | Oguma | |
| 2006/0248384 A1 | 11/2006 | Safford | |
| 2007/0006226 A1 | 1/2007 | Hendel | |
| 2007/0094659 A1 | 4/2007 | Singh et al. | |
| 2007/0101191 A1* | 5/2007 | Iwama | 714/15 |
| 2008/0120518 A1 | 5/2008 | Ritz et al. | |
| 2008/0133968 A1 | 6/2008 | Muppirala et al. | |
| 2008/0189468 A1* | 8/2008 | Schmidt et al. | 711/6 |
| 2008/0307425 A1 | 12/2008 | Tripathi | |
| 2009/0113034 A1 | 4/2009 | Krishnappa et al. | |
| 2010/0162052 A1 | 6/2010 | Shimogawa | |
| 2010/0306573 A1 | 12/2010 | Gupta | |
| 2011/0225458 A1* | 9/2011 | Zuo et al. | 714/37 |
| 2011/0246767 A1* | 10/2011 | Chaturvedi et al. | 713/164 |
| 2013/0097354 A1* | 4/2013 | Arges et al. | 711/6 |
| 2013/0305007 A1* | 11/2013 | Kawano et al. | 711/165 |
| 2014/0317438 A1* | 10/2014 | Ripoll | 714/4.11 |

FOREIGN PATENT DOCUMENTS

| | | |
|---|---|---|
| EP | 2453359 A1 | 5/2012 |
| JP | 7-234808 A | 9/1995 |
| JP | 10-133918 A | 5/1998 |
| JP | 11-212836 | 8/1999 |
| JP | 11-212836 A | 8/1999 |
| JP | 2001-229053 | 8/2001 |
| JP | 2001-229053 A | 8/2001 |
| JP | 2001-290678 A | 10/2001 |
| JP | 2003-256396 A | 9/2003 |
| JP | 2005-122334 | 5/2005 |
| JP | 2006-72931 | 3/2006 |
| JP | 2006-172100 A | 6/2006 |
| JP | 2007-133544 A | 5/2007 |

OTHER PUBLICATIONS

Disclosed Anonymously: "Improving operating system crash dump performance on a virtual machine", Research Disclosure, Mason Publications, Hampshire, GB, vol. 519, No. 77, Jul. 1, 2007, pp. 756, XP007137479, ISSN: 0374-4353.

International Search Report mailed Sep. 15, 2009 for corresponding International Application No. PCT/JP2009/003257, 2 pages.

Extended European Search Report dated Jul. 1, 2013 for corresponding European Patent Application No. 09847046.1, 9 pages.

PCT International Search Report mailed Mar. 29, 2011 for corresponding International Application No. PCT/JP2010/073637, PCT/ISA/210, 1 page.

PCT International Preliminary Report on Patentability mailed Jul. 11, 2013 for corresponding International Application No. PCT/JP2010/073637, PCT/IB/338, 6 pages.

USPTO Non-Final Rejection mailed Sep. 23, 2013 for corresponding U.S. Appl. No. 13/342,633 (related), 28 pages.

USPTO Non-Final Rejection mailed Mar. 14, 2014 for corresponding U.S. Appl. No. 13/926,423 (related), 17 pages.

USPTO Final Rejection mailed Mar. 24, 2014 for corresponding U.S. Appl. No. 13/342,633 (related), 15 pages.

Japanese Office Action mailed Mar. 25, 2014 for corresponding Japanese Patent Application No. 2012-550617, with English Translation, 5 pages.

Yasui, Taku, "Kernel Memory Management," Nikkei Linux, Nikkei Business Publications, Inc., Jan. 8, 2004, vol. 6, No. 1, pp. 123-130, with Partial English Translation.

Extended European Search Report dated Jun. 13, 2014 for corresponding European Patent Application No. 10861466.0, 6 pages.

Japanese Office Action mailed Sep. 2, 2014 for corresponding Japanese Patent Application No. 2012-550617, with Partial English Translation, 4 pages.

USPTO Notice of Allowance and Fees Due mailed Jul. 21, 2014 for corresponding U.S. Appl. No. 13/342,633 (related), 13 pages.

USPTO Notice of Allowance and Fees Due mailed Nov. 7, 2014 for corresponding U.S. Appl. No. 13/342,633 (related), 29 pages.

USPTO Notice of Allowance and Fees Due mailed Nov. 26, 2014 for corresponding U.S. Appl. No. 13/926,423 (related), 29 pages.

Taiwanese Office Action mailed on Nov. 28, 2014 for corresponding Taiwanese Patent Application No. 102118623, with Partial English Translation, 13 pages.

Korean Office Action mailed Jan. 6, 2015, for corresponding Korean Patent Application No. 10-2013-0069068, with Partial English Translation, 8 pages.

Japanese Office Action mailed Jan. 20, 2015, for corresponding Japanese Patent Application No. 2012-550617, with Partial English Translation, 5 pages.

USPTO Final Rejection mailed Aug. 21, 2014 for corresponding U.S. Appl. No. 13/926,423 (related), 16 pages.

Japanese Office Action mailed Nov. 4, 2015 for corresponding Japanese Patent Application No. 2012-550617, with Partial English Translation, 30 pages.

\* cited by examiner

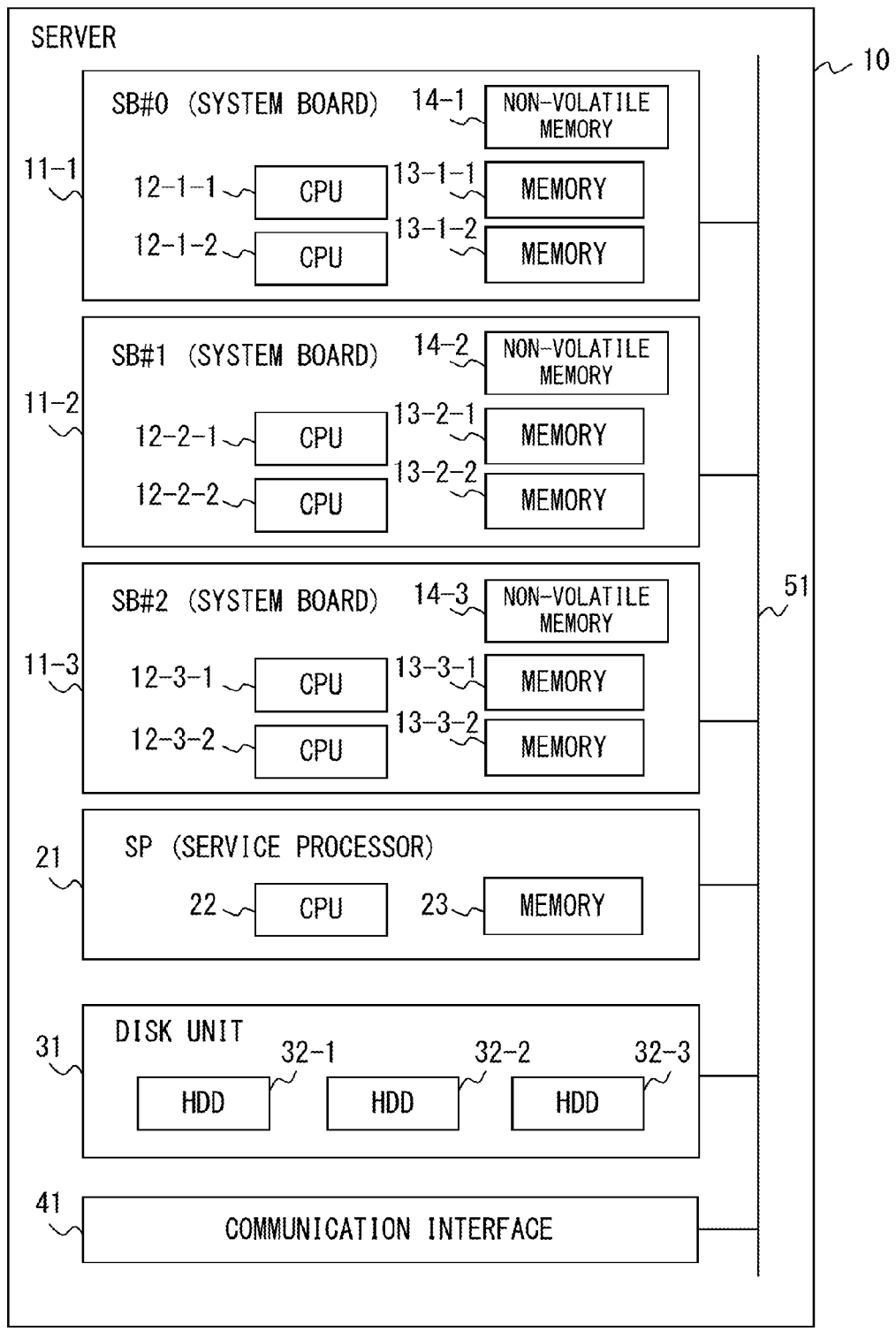
F I G. 1

| Block | PA Base (STARTING ADDRESS) | SIZE |
|---|---|---|
| 0 | xxxxxxx | 1.5G |
| 1 | yyyyyy | 1.0G |
|  |  |  |
|  |  |  |
| N | zzzzzzz | 512M |

FIG. 8

| Block | RA Base (STARTING ADDRESS) | SIZE |
|---|---|---|
| 0 | aaaaaaa | 1.5G |
|  |  |  |
|  |  |  |
| N | ccccccc | 512M |

F I G. 1 0

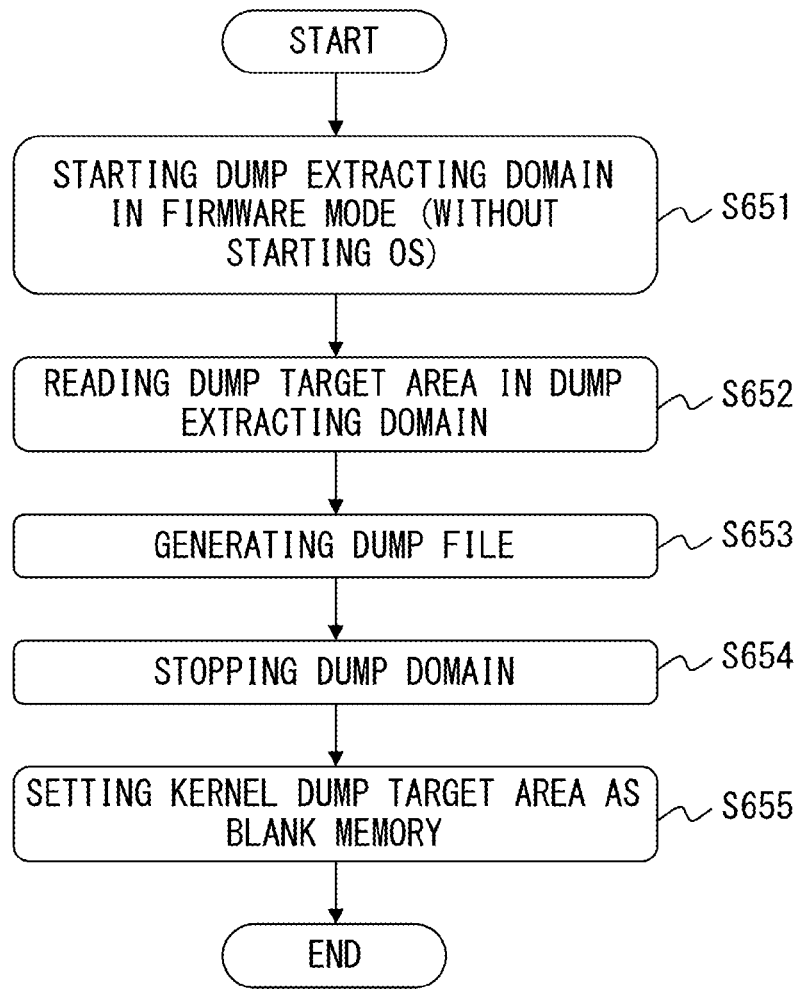
F I G. 1 1

FIG. 13

AT EMERGENCY STOP

| DOMAIN | PA BASE (STARTING ADDRESS) | SIZE | RA BASE (STARTING ADDRESS) |
|---|---|---|---|
| #0 | xxxxx | 8G | aaaaa |
|  |  |  |  |
|  |  |  |  |
|  |  |  |  |
|  |  |  |  |

{ DUMP TARGET AREA (bracket under #0 row) }

AT DUMP

| DOMAIN | PA BASE (STARTING ADDRESS) | SIZE | RA BASE (STARTING ADDRESS) |
|---|---|---|---|
| #3 | xxxxx | 8G | aaaaa |
| #0 | yyyyy | 8G | aaaaa |
|  |  |  |  |
|  |  |  |  |
|  |  |  |  |

AFTER DUMP

| DOMAIN | PA BASE (STARTING ADDRESS) | SIZE | RA BASE (STARTING ADDRESS) |
|---|---|---|---|
|  |  |  |  |
| #0 | yyyyy | 8G | aaaaa |
|  |  |  |  |
|  |  |  |  |
|  |  |  |  |

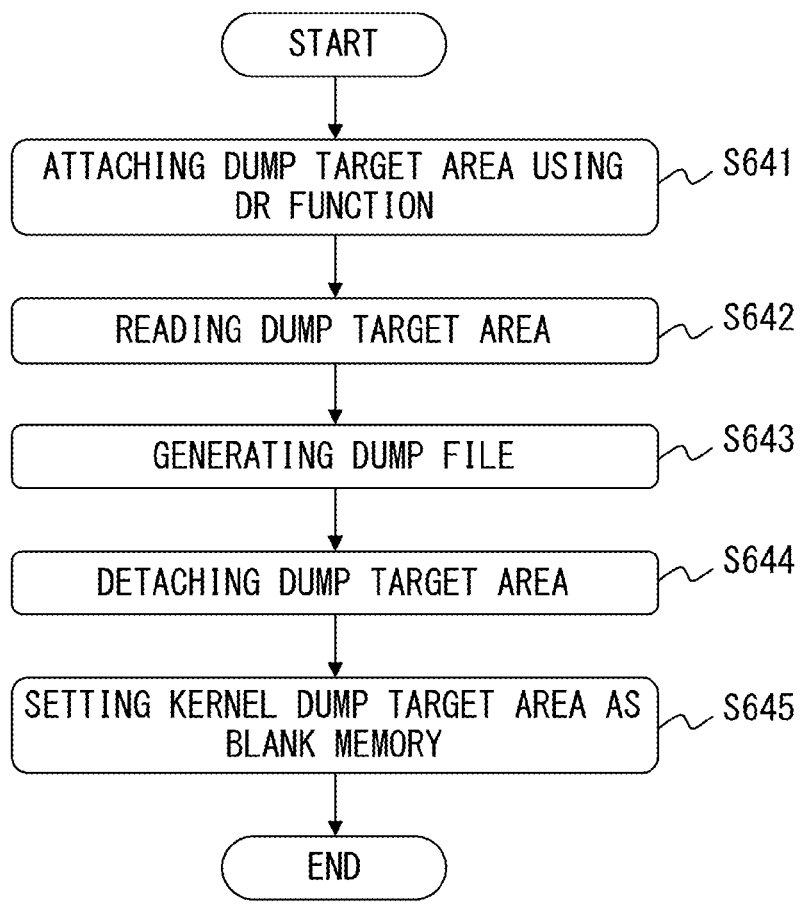
F I G. 1 4

FIG. 16

AT EMERGENCY STOP

| DOMAIN | PA BASE (STARTING ADDRESS) | SIZE | RA BASE (STARTING ADDRESS) |
|---|---|---|---|
| #0 | xxxxx | 8G | aaaaa |
| | | | |
| | | | |
| | | | |

{ DUMP TARGET AREA

AT DUMP

| DOMAIN | PA BASE (STARTING ADDRESS) | SIZE | RA BASE (STARTING ADDRESS) |
|---|---|---|---|
| #0 | xxxxx | 8G | bbbbb |
| #0 | yyyyy | 8G | aaaaa |
| | | | |
| | | | |

AFTER DUMP

| DOMAIN | PA BASE (STARTING ADDRESS) | SIZE | RA BASE (STARTING ADDRESS) |
|---|---|---|---|
| | | | |
| #0 | yyyyy | 8G | aaaaa |
| | | | |
| | | | |

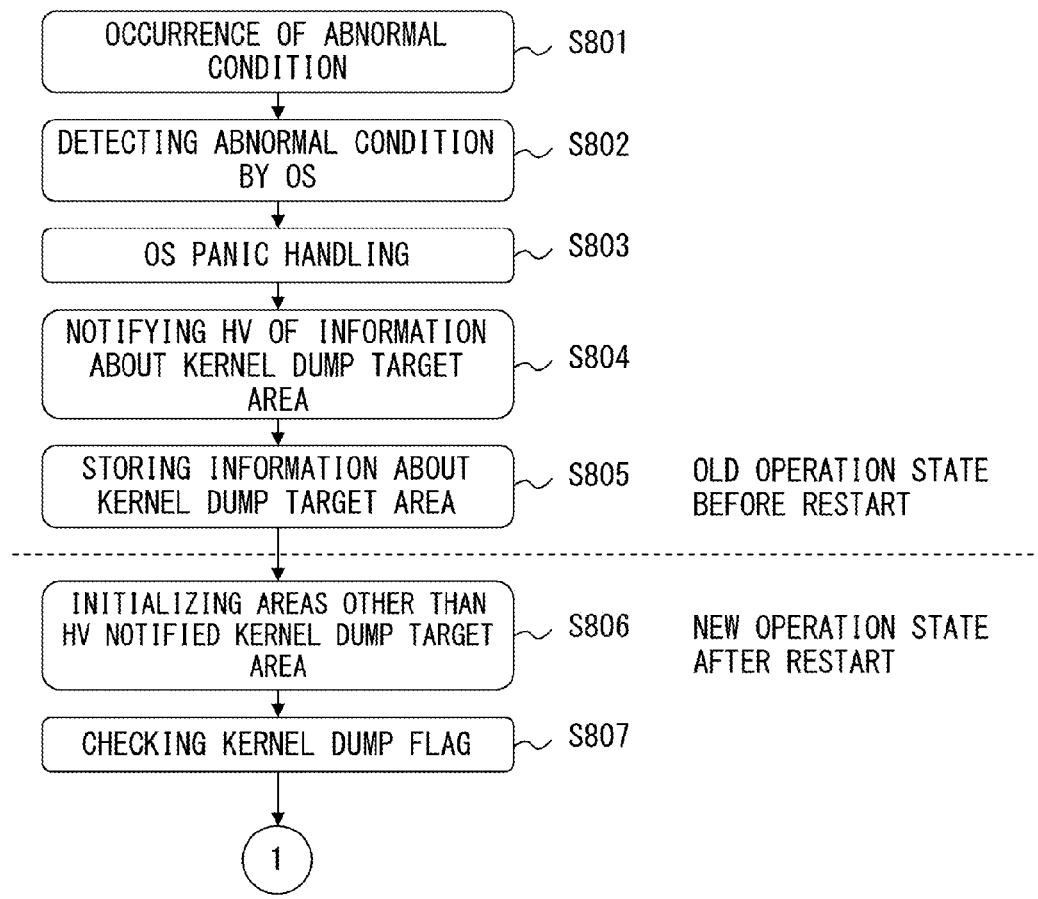
F I G. 1 8 A

INFORMATION PROCESSING DEVICE WITH MEMORY DUMP FUNCTION, MEMORY DUMP METHOD, AND RECORDING MEDIUM

CROSS-REFERENCE TO RELATED APPLICATIONS

This application is based upon and claims the benefit of priority of the prior Japanese Patent Application No. 2012-141495, filed on Jun. 22, 2012, the entire contents of which are incorporated herein by reference.

FIELD

The embodiments discussed herein are related to an information processing device with a memory dump function, a memory dump method, and a recording medium which stores a memory dump program.

BACKGROUND

Recently, a UNIX (registered trademark) server and an IA server have been introduced to a core system, and the high availability of the UNIX (registered trademark) server and the IA server is emphasized. Generally, when there occurs a fatal error in a system, the system is stopped in an emergency, and the memory dump is stored on the disc for search of the cause of the error.

While stopping the system, the system is not used. Therefore, it is very important to quickly restart the system.

However, in recent years, a server implemented with memory of a capacity in the terabyte (TB) order has been introduced. In such a system, it takes a long time to extract a memory dump, and a system is not quickly restarted.

There are also a method of storing memory contents at an emergency stop on another memory unit without storing a memory dump on a disc, and a method of storing apart of memory and converting the memory contents not stored after a restart into a dump file.

However, in the conventional methods, a memory dump at the occurrence of an abnormal condition is stored on another memory unit or disc. Therefore, if a large size of memory dump is to be stored, it takes a long time to copy the memory, thereby disabling the system to be quickly restarted.

When an operating system detects a fatal error and the system is stopped in an emergency, the operating system which has detected an abnormal condition extracts a dump. Therefore, the abnormal condition is detected again while dumping memory, thereby causing a secondary damage such as an occurrence of a hang-up etc.

PATENT DOCUMENT

[Patent Document 1] Japanese Laid-open Patent Publication No. 11-212836
[Patent Document 2] Japanese Laid-open Patent Publication No. 2001-229053
[Patent Document 3] Japanese Laid-open Patent Publication No. 2006-72931
[Patent Document 4] Japanese Laid-open Patent Publication No. 2005-122334

SUMMARY

According to an aspect of the invention, an information processing device includes: a memory; a processing unit which operates a virtual machine, an operating system which is executed on the virtual machine, and a hypervisor which controls the virtual machine by executing a program stored on the memory; and a control unit which controls a system including the memory and the processing unit.

When detecting an error of the hypervisor, the processing unit stops the operating system, and notifies the control unit of a first memory area used by the hypervisor.

Then, the processing unit stops the hypervisor, changes a memory area used by the hypervisor into a second memory area different from the first memory area notified by the control unit, and starts the hypervisor using the second memory area as an available area.

Furthermore, the processing unit starts the operating system, resumes the application program which is operated on the operating system, reads data in the first memory area, and writes the data to a file as a dump file of the hypervisor.

In another aspect of the invention, the information processing device according to the embodiment includes a memory and a processing unit which executes an operating system or operates a virtual machine and an operating system executed on the virtual machine.

When detecting an error in the operating system being executed, the processing unit stops the operating system in which the error has been detected, and changes the memory area used by the stopped operating system into a second memory area different from a first memory area which has been used by the kernel of the stopped operating system.

Then, the processing unit starts the stopped operating system using the second memory area as an available area, resumes the application program operated on the operating system, reads the data in the first memory area, and writes the data to a file as a dump file of the operating system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a hardware configuration of a server according to an embodiment;
FIG. 8 is an example of HV dump target area information.

FIG. 10 is an example of kernel dump target area information;

FIG. 11 is a flowchart of the memory dump generating process of a kernel in a dump domain;

FIG. 13 illustrates PA-RA mapping information in dumping memory in a dump domain;

FIG. 14 is a flowchart of the memory dump generating process of the kernel using a memory dynamic reconfiguration function;

FIG. 16 illustrates PA-RA mapping information in dumping memory using a memory dynamic reconfiguration function;

FIG. 18A is a flowchart of the memory dump generating process according to the fourth embodiment;

DESCRIPTION OF EMBODIMENTS

Figure 2:
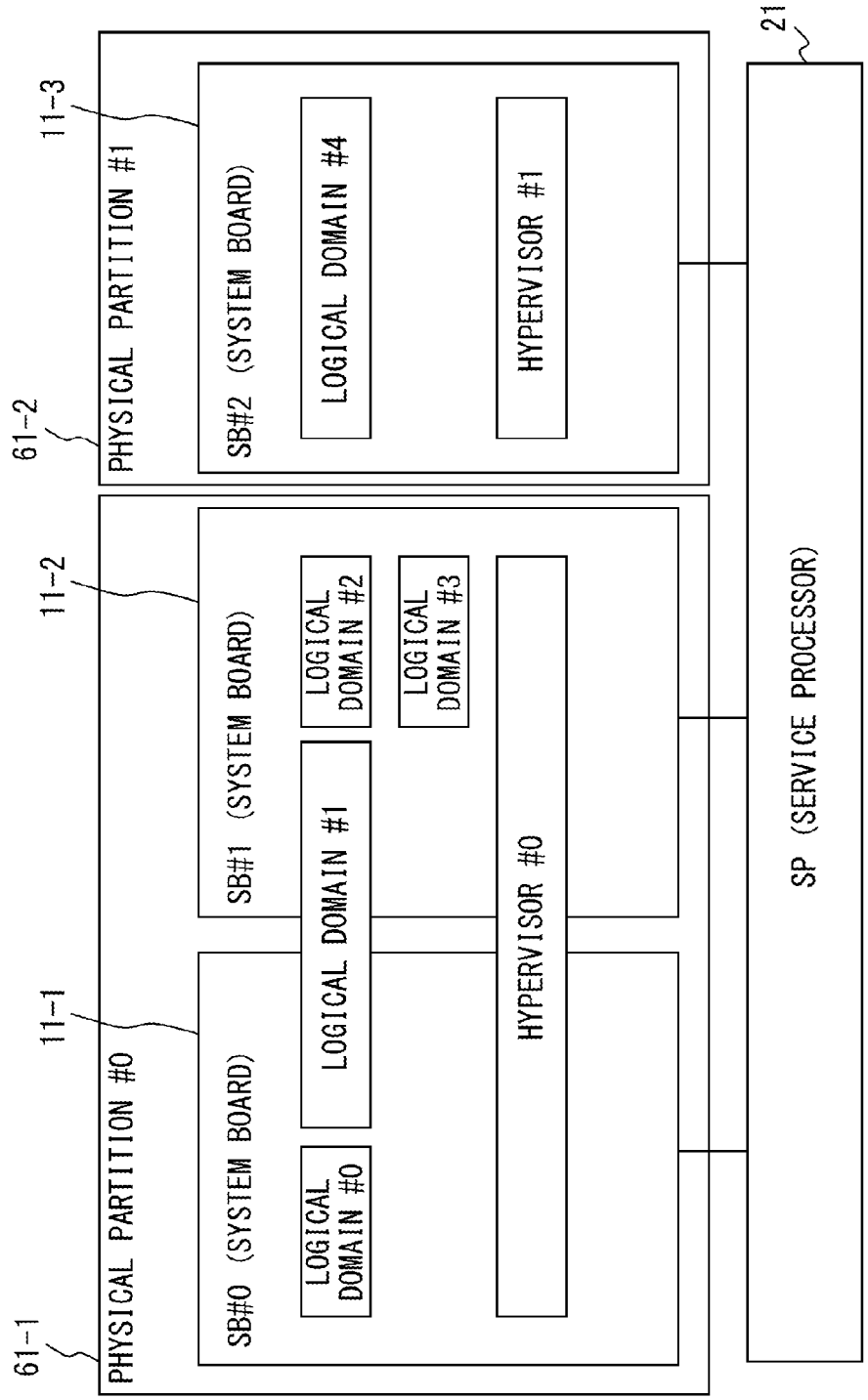
FIG. 2 illustrates the correspondence between a server and a function according to an embodiment.

The embodiments of the present invention are described below with reference to the attached drawings.

The configuration of the hardware of the server according to an embodiment.

A server (information processing device) 10 includes a system board 11-i (i=1~3), a service processor (SP) 21, a disc unit 31, and a communication interface 41.

The system board 11-i, the service processor 21, the disc unit 31, and the communication interface 41 are connected through a bus 51.

The system board 11-i includes a CPU 12-i-k (k=1, 2), a non-volatile memory unit 14-i, and memory 13-i-k.

The service processor 21 is a device which controls the server 10, a physical partition in the server 10, etc. The service processor 21 includes a CPU 22 and memory 23. The service processor 21 is an example of a control unit.

The CPU 22 performs various processes such as the control of the server 10, the physical partition in the server 10, etc.

The memory 23 temporarily stores the data used by the service processor 21. The memory 23 is, for example, RAM.

The disc unit 31 includes an Hard Disk Drive (HDD) 32-i (i=1~3).

An HDD 32 stores the data used by a server 101. The HDD 32 is an example of a storage device.

The communication interface 41 is an interface which communicates with a device connected to the server 10.

FIG. 2 is an example of the correspondence between a server and a function according to the present embodiment.

The server 10 is operated by being divided into two physical partitions 61-k (k=1, 2). In the specification, the physical partitions 61-1 and 61-2 may be expressed as a physical partition #0 and a physical partition #1 respectively.

The physical partitions #0 and #1 are controlled by the service processor 21. The CPU included in the physical partitions #0 and #1 is an example of a processing unit.

The physical partition #0 configured by the system boards 11-1 and 11-2 is further divided into four logical domains #0 through #3 in the physical partition #0, and an independent operating system (OS) executed in each of the logical domains #0 through #3. In addition, the hypervisor (HV) #0 controls the correspondence between the physical resources in the physical partition #0 and each of the logical domains #0 through #3.

In the physical partition #1 configured by the system board 11-3, the operating system (OS) is executed in the logical domain #4. Furthermore, the hypervisor #1 controls the correspondence between the physical resources and the logical domain #4 in the physical partition #1.

Figure 3:
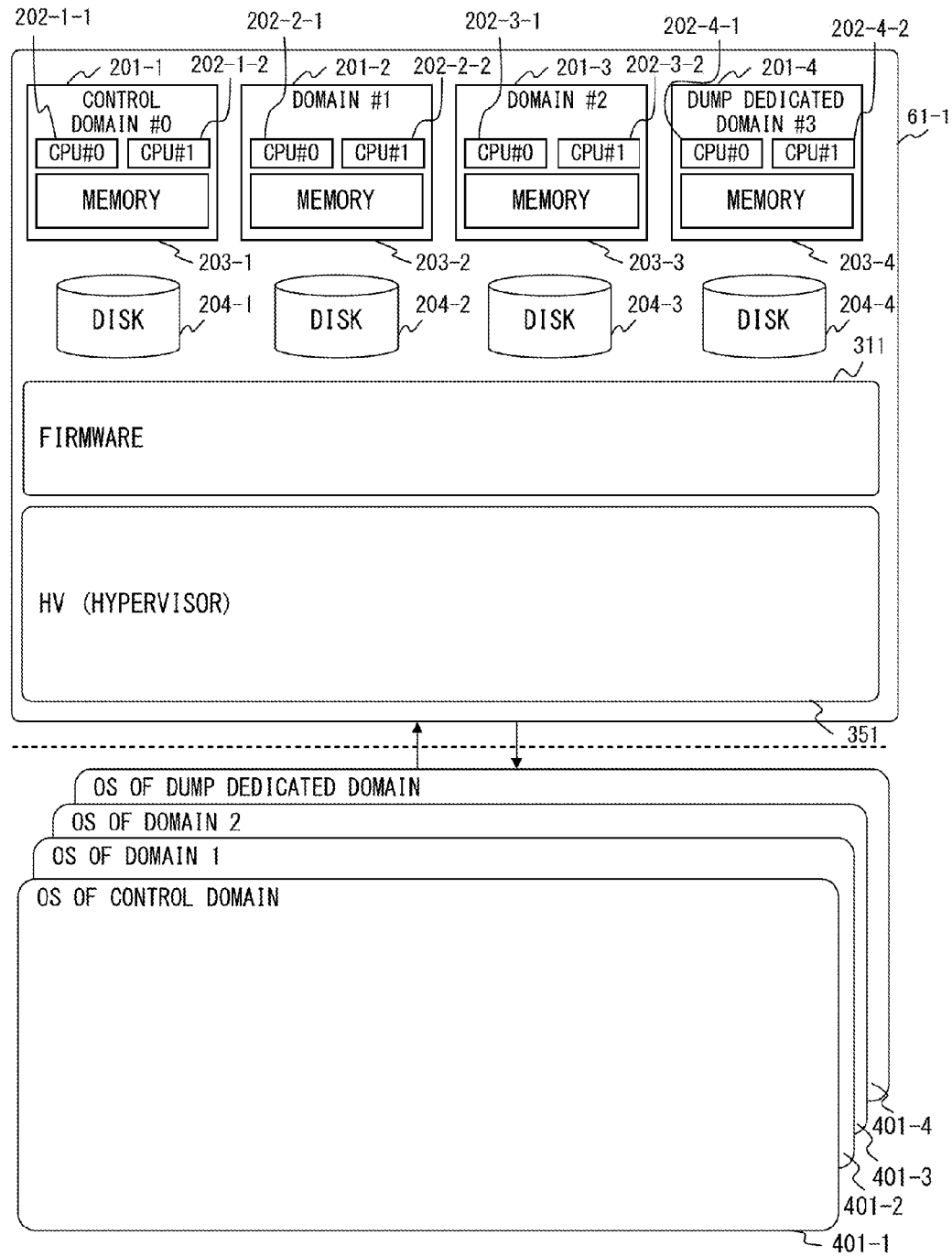
FIG. 3 is a block diagram of the function of the physical partition according to an embodiment.

FIG. 3 is a block diagram of the function of the physical partition according to an embodiment.

The physical partition 61-1 includes a logical domain 201-m (m=1~4), firmware (FM) 311, and a hypervisor (HV) 351.

The physical partition 61-1 in FIG. 3 corresponds to the physical partition 61-1 in FIG. 2.

The logical domain 201-1 through 201-4 respectively correspond to the logical domains #0 through #3 in FIG. 2.

In the specification, the logical domain 201-1 may be expressed as a control domain #0.

In the specification, the logical domain 201-4 may be expressed as a dump extraction dedicated domain #3 or a dump domain 201-4.

In the descriptions below, a logical domain refers to a virtual machine unless otherwise specified.

The logical domain 201-m includes a CPU 202-m-k (k=1, 2), memory 203-m, and a disk 204-m. In the descriptions below, a CPU 202, memory 203, and a disc 204 are respectively a virtual CPU, virtual memory, and a virtual disk.

The CPU 202-m-k performs each process.

The memory 203-m stores various programs and data read from the disk 204-m.

The firmware 311 controls the entire server 10 (physical partitions 61-1 and 61-2), and performs, for example, the initialization of hardware, the diagnostic of memory, the monitoring of temperature, etc. The firmware 311 includes the power on self test (POST) developed on the service processor 21 in FIG. 1 and the non-volatile memory units 14-1 and 14-2 of the system boards 11-1 and 11-2. The power on self test (POST) is a program which conducts a diagnosis on and initializes hardware resources at the start of the system.

A hypervisor 351 controls the logical domain 201-m and an operating system (OS) 401-m which is executed on the logical domain 201-m. The hypervisor 351 is developed on the memory 13-1-1, 13-1-2, 13-2-1, and 13-2-2 of the system boards 11-1 and 11-2 in FIG. 1, and executed by the CPUs 12-1-1, 12-1-2, 12-2-1, and 12-2-2.

The lower part in FIG. 3 indicates the software in a physical partition 61-1.

The OS 401-m is executed in each of the logical domains #0 through #3 in the physical partition 61-1.

The OS 401-1 through 401-4 respectively correspond to the operating systems of the logical domains 201-1 through 201-4.

Figure 4:
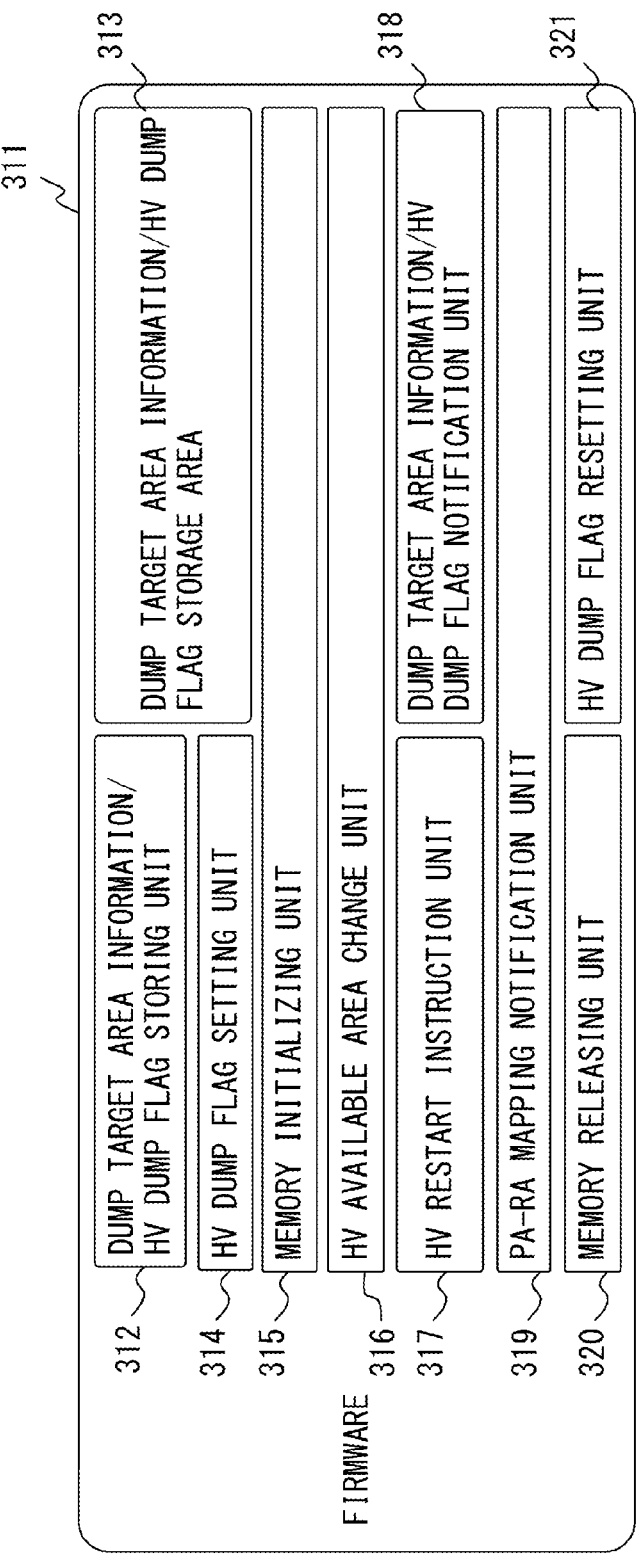
FIG. 4 is a configuration of the firmware according to an embodiment.

FIG. 4 is a detailed configuration of the firmware according to an embodiment.

The firmware 311 includes a dump target area information/HV dump flag storing unit 312, a dump target area information/HV dump flag storage area 313, a HV dump flag setting unit 314, a memory initializing unit 315, an HV available area change unit 316, an HV restart instruction unit 317, a dump target area information/HV dump flag notification unit 318, a PA-RA mapping notification unit 319, a memory releasing unit 320, and an HV dump flag resetting unit 321.

The dump target area information/HV dump flag storing unit 312 stores dump target area information and an HV dump flag in the dump target area information/HV dump flag storage area 313.

The dump target area information/HV dump flag storage area 313 stores dump target area information and an HV dump flag. The dump target area information indicates a dump target area, and includes the information about the starting address (PA base) and the size of a dump target area. The HV dump flag is control information indicating whether or not a dump file of the memory area used by a hypervisor is to be generated. The HV dump flag may include the information (HV live dump flag) indicating whether or not a memory dump of the hypervisor being operated is to be extracted.

The HV dump flag setting unit 314 sets a value of an HV dump flag. For example, the HV dump flag setting unit 314 sets the HV dump flag as TRUE when the HV dump is extracted.

The memory initializing unit 315 initializes memory.

The HV available area change unit 316 changes the area of the memory used by the hypervisor 351.

The HV restart instruction unit 317 instructs the hypervisor 351 to perform a restart.

The dump target area information/HV dump flag notification unit 318 reports about dump target area information and an HV dump flag.

The PA-RA mapping notification unit 319 notifies the hypervisor 351 of the PA-RA mapping necessary in processing the OS, and a PA-RA mapping unit 368 of the hypervisor 351 converts a physical address (PA) into a real address (RA), or a real address (RA) into a physical address (PA) using the notified PA-RA mapping.

The memory releasing unit 320 performs a memory releasing process.

The HV dump flag resetting unit 321 resets an HV dump flag. In detail, the HV dump flag resetting unit 321 sets the HV dump flag as FALSE.

Figure 5:
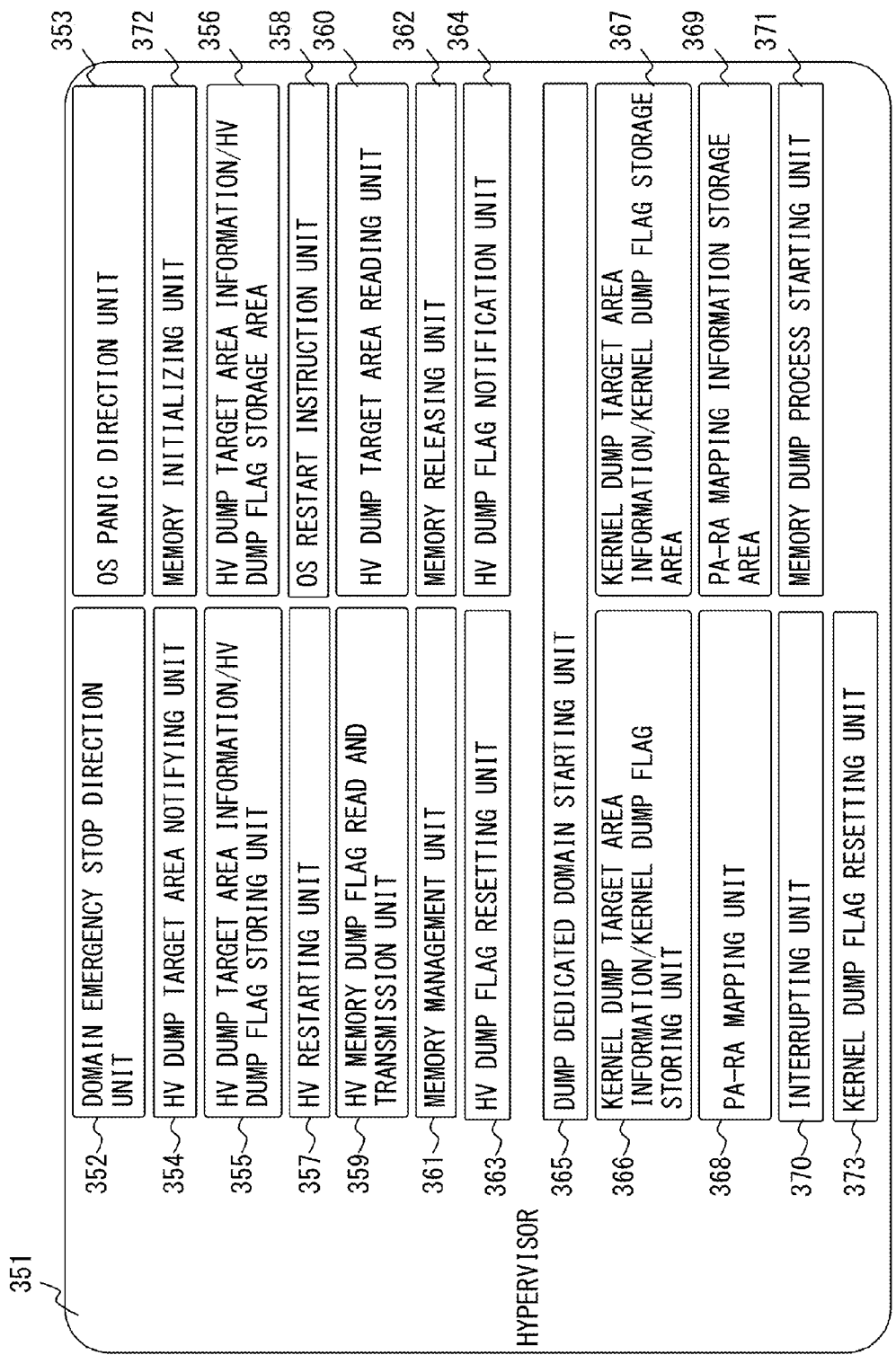
FIG. 5 is a configuration of the hypervisor according to an embodiment.

FIG. 5 is a detailed configuration of the hypervisor according to an embodiment.

The hypervisor 351 includes a domain emergency stop direction unit 352, an OS panic direction unit 353, an HV dump target area notifying unit 354, an HV dump target area information/HV dump flag storing unit 355, an HV dump target area information/HV dump flag storage area 356, an HV restarting unit 357, an OS restart instruction unit 358, an HV memory dump flag read and transmission unit 359, an HV dump target area reading unit 360, a memory management unit 361, a memory releasing unit 362, an HV dump flag resetting unit 363, an HV dump flag notification unit 364, a dump dedicated domain starting unit 365, a kernel dump target area information/kernel dump flag storing unit 366, a kernel dump target area information/kernel dump flag storage area 367, a PA-RA mapping unit 368, a PA-RA mapping information storage area 369, an interrupting unit 370, a memory dump process starting unit 371, a memory initializing unit 372, and a kernel dump flag resetting unit 373.

The domain emergency stop direction unit 352 directs the domain 201 to perform an emergency stop.

The OS panic direction unit 353 directs an OS 401 to perform an emergency stop (panic).

The HV dump target area notifying unit 354 reads the HV dump target area information from the HV dump target area information/HV dump flag storage area 356 and transmits the information.

The HV dump target area information/HV dump flag storing unit 355 stores the HV dump target area information and the HV dump flag in the HV dump target area information/HV dump flag storage area 356.

The HV dump target area information/HV dump flag storage area 356 stores the HV dump target area information and the HV dump flag. The HV dump target area information indicates the memory area (HV dump target area) used by the hypervisor 351, and includes the information about the starting address (PA base) and the size of the memory area. The HV dump flag is the control information as to whether or not a dump file of the memory area used by the hypervisor is to be generated.

The HV restarting unit 357 stops the hypervisor 351, and restarts the hypervisor 351.

The OS restart instruction unit 358 directs the OS 401 to perform a restart.

the HV memory dump flag read and transmission unit 359 reads and transmit an HV dump flag.

The HV dump target area reading unit 360 reads and transmits the contents of the memory area indicated by the HV dump target area information. Otherwise, the HV dump target area reading unit 360 reads and transmits the contents of the memory area used by the current hypervisor 351.

The memory management unit 361 manages memory.

The memory releasing unit 362 performs a memory releasing process.

The HV dump flag resetting unit 363 resets an HV dump flag. In detail, the HV dump flag resetting unit 363 sets, for example, the HV dump flag as FALSE.

The HV dump flag notification unit 364 reports about an HV dump flag.

The dump dedicated domain starting unit 365 starts the dump dedicated domain in a firmware mode. The firmware mode is a mode in which the OS is not started, that is, the mode in which the system is aborted before the OS is started.

The kernel dump target area information/kernel dump flag storing unit 366 stores the kernel dump target area information and the kernel dump flag in the kernel dump target area information/kernel dump flag storage area 367.

The kernel dump target area information/kernel dump flag storage area 367 stores the kernel dump target area information and the kernel dump flag. The kernel dump target area information indicates the memory area (kernel dump target area) used by the kernel of the OS 401 when the panic occurred, and includes the starting address (RA base) and the size of the memory area. The kernel dump flag indicates as to whether or not the memory dump of the kernel of the OS 401 is extracted. Furthermore, the kernel dump flag may also indicate in which method the memory dump of the kernel is to be extracted. The kernel dump flag indicates, for example, 0 as not dumping memory of a kernel, 1 as dumping memory in the dump domain, or 2 as dumping memory using the memory dynamic reconfiguration function. The kernel dump flag may be received from the OS 401, or the hypervisor 351 may set and hold the flag in advance.

The PA-RA mapping unit 368 performs the mapping between the physical address (PA) and the real address (RA). The PA is the physical address of memory, and the RA is the real address on the domain (operating system).

The PA-RA mapping information storage area 369 stores the information about the mapping between the PA and the RA.

The interrupting unit 370 allows the OS 401 to perform interrupt processing when the memory dump of the kernel of the OS 401 is extracted. When the interrupt processing is accepted, it is judged that the memory dump of the kernel of the OS 401 may be extracted, and the memory dump processing of the kernel of the OS 401 is performed. If the interrupt processing is not accepted, it is judged that the processing is not performed, thereby terminating the process without performing the memory dump processing of the kernel of the OS 401.

The memory dump process starting unit 371 allows the logical domain 201-1 to start the memory dump processing of the hypervisor 351.

The memory initializing unit 372 initialize the memory.

The kernel dump flag resetting unit 373 resets the kernel dump flag. For example, the kernel dump flag resetting unit 373 deletes the kernel dump flag or sets 0 not to dump the memory of the kernel.

Figure 6:
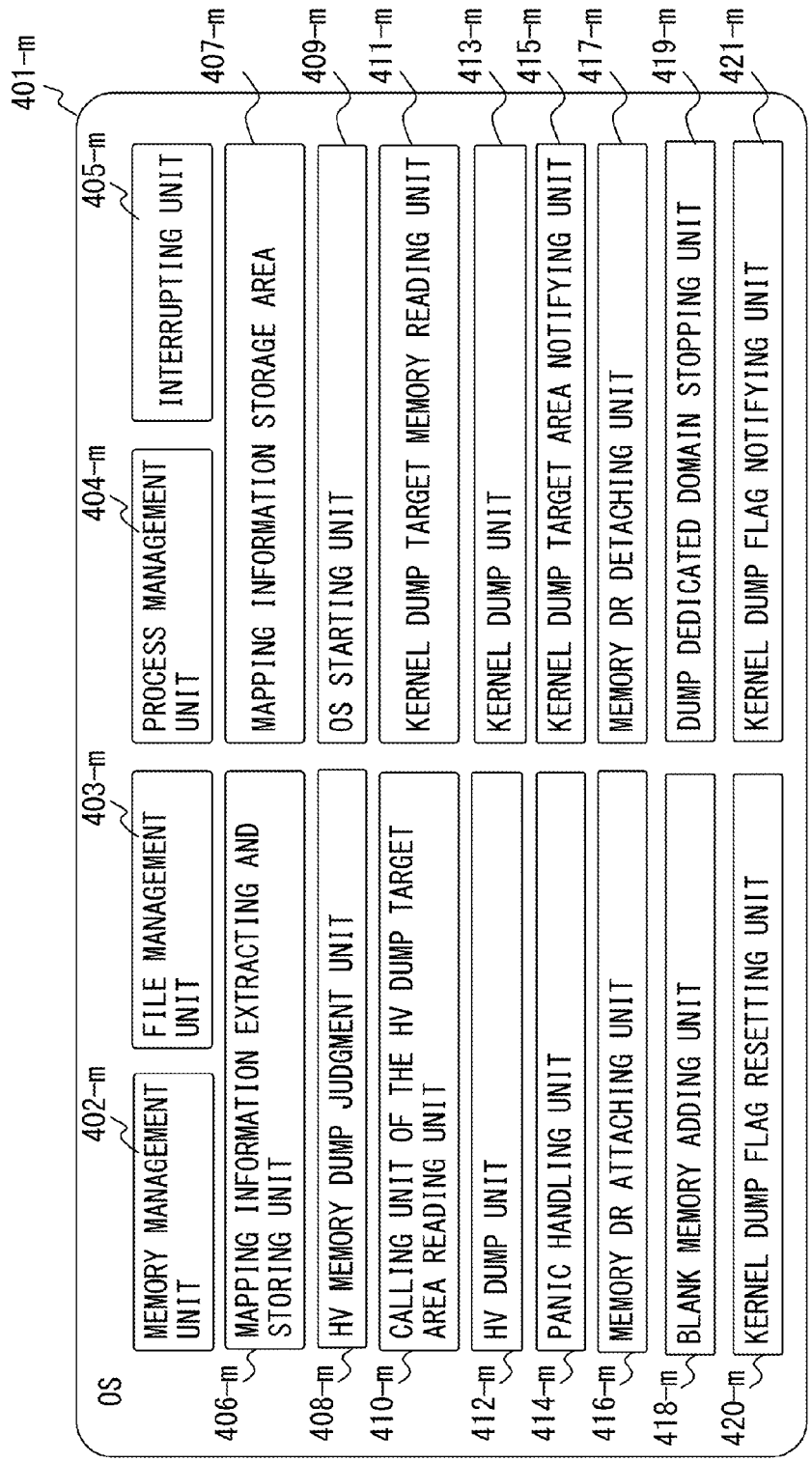
FIG. 6 is a configuration of the OS according to an embodiment.

FIG. 6 is a detailed configuration of the OS according to an embodiment.

The OS 401-m includes a memory management unit 402-m, a file management unit 403-m, a process management unit 404-m, an interrupting unit 405-m, a mapping information extracting and storing unit 406-m, a mapping information storage area 407-m, an HV memory dump judgment unit 408-m, an OS starting unit 409-m, an calling unit 410-m of the HV dump target area reading unit, a kernel dump target memory reading unit 411-m, an HV dump unit 412-m, a kernel dump unit 413-m, a panic handling unit 414-m, a kernel dump target area notifying unit 415-m, a memory DR attaching unit 416-m, a memory DR detaching unit 417-m, a blank memory adding unit 418-m, a dump dedicated domain stopping unit 419-m, a kernel dump flag resetting unit 420-m, and a kernel dump flag notifying unit 421-m.

The memory management unit 402-m assigns the memory 203-m used by the OS 401-m.

The file management unit 403-m manages a file as the data stored in a disk.

The process management unit 404-m manages the process of the program executed by the OS 401-m.

The interrupting unit 405-m performs the interrupt processing.

The mapping information extracting and storing unit 406-m stores the information necessary for getting and analyzing the dump of the memory 203-m in the mapping information storage area 407-m.

The mapping information storage area 407-m stores the information necessary for getting and analyzing the dump of the memory 203-m. The information stored in the mapping information storage area 407-m is the mapping information about each segment (logical address, physical address, size, etc.) such as a text region of the kernel, a data region, a heap region, a stack region, etc., and the mapping information about each type of control table such as an address conversion table, a page table, etc.

The HV memory dump judgment unit 408-m judges whether the HV dump flag is true or false, and whether or not the memory dump of the hypervisor is to be extracted.

The OS starting unit 409-m restarts the OS 401-m.

The calling unit 410-m of the HV dump target area reading unit calls the HV dump target area reading unit 360.

The kernel dump target memory reading unit 411-m reads the contents of the memory of the kernel dump target area (memory area used by the kernel of the OS 401-m when the panic occurred).

The HV dump unit 412-m receives the memory contents read by the HV dump target area reading unit 360 from the HV dump target area reading unit 360, and generates a dump file.

The kernel dump unit 413-m stores the read memory contents of the kernel dump target area in the file (generates a dump file).

The panic handling unit 414-m performs an emergency stop (panic) for the domain 201-m.

The kernel dump target area notifying unit 415-m notifies the hypervisor 351 of the memory area used by the OS 401-m when the panic occurred.

The memory DR attaching unit 416-m attaches the memory area into the domain 201-m.

The memory DR detaching unit 417-m detaches the memory area from the domain 201-m.

The blank memory adding unit 418-m notifies the memory management unit 402-m of the dumped memory area.

The dump dedicated domain stopping unit 419-m stops a domain (dump dedicated domain) in which a dump is extracted after dumping memory.

The kernel dump flag resetting unit 420-m instructs the hypervisor 351 to reset a kernel dump flag.

The kernel dump flag notifying unit 421-m notifies the hypervisor 351 of a kernel dump flag. The kernel dump flag notifying unit 421-m notifies the hypervisor 351 of a kernel dump flag when it is necessary to dump a memory of the kernel. For example, the kernel dump flag notifying unit 421-m set "0 indicating that the memory dump of the kernel is not extracted" for the value of the kernel dump flag when the memory dump of the kernels not extracted, sets "1 indicating that the dump is extracted in the dump domain" for the value of the kernel dump flag when the memory dump of the kernel is extracted in the dump domain, and sets "2 indicating that the dump is extracted using the memory dynamic reconfiguration function" for the value of the kernel dump flag when the memory dump of the kernel is extracted using the memory dynamic reconfiguration function.

(First Embodiment)

According to the first embodiment, the memory dump of a hypervisor is extracted using a control domain.

Figure 7A:
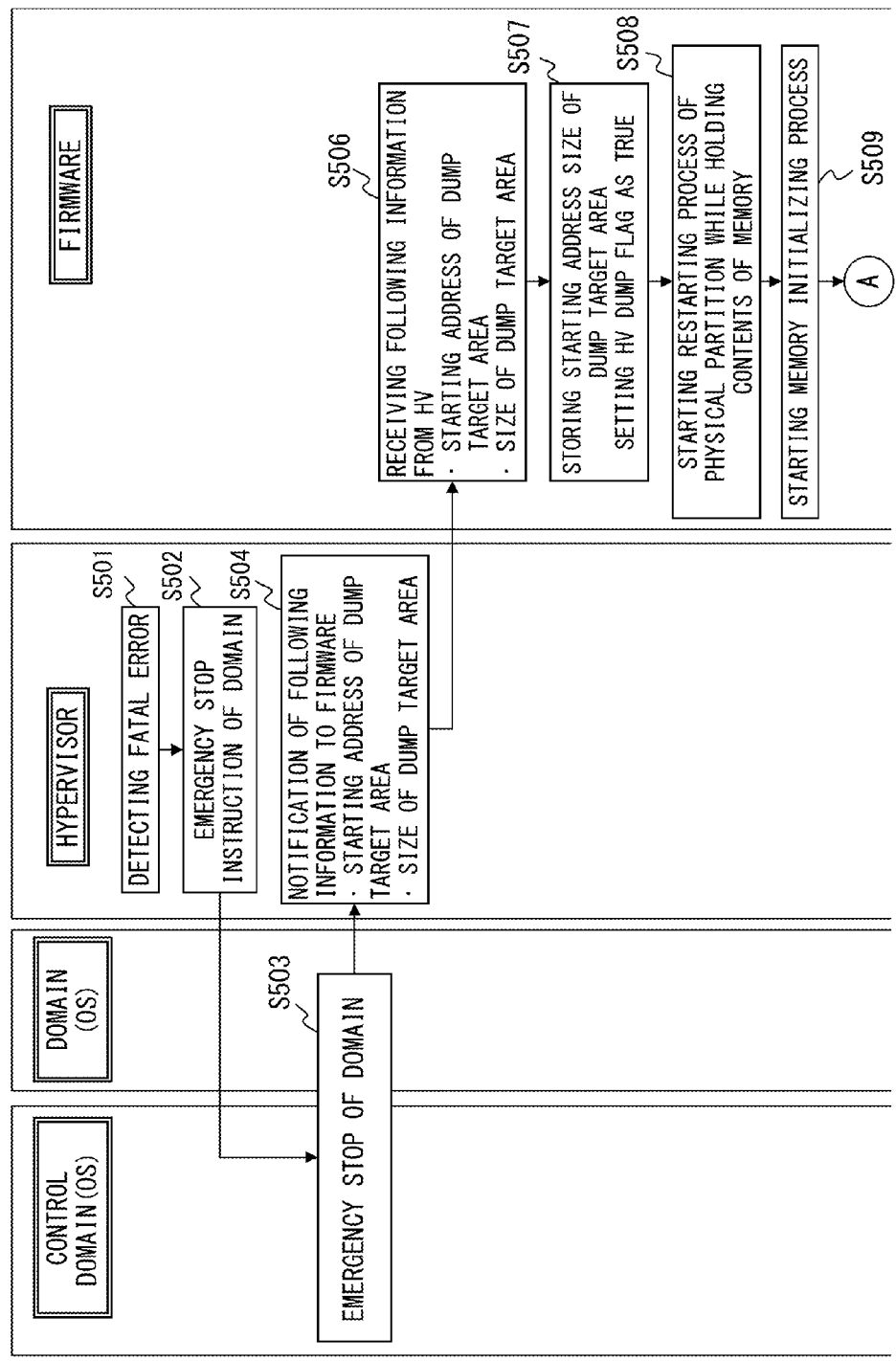
FIG. 7A is a flowchart of the memory dump generating process according to the first embodiment.
Figure 7B:
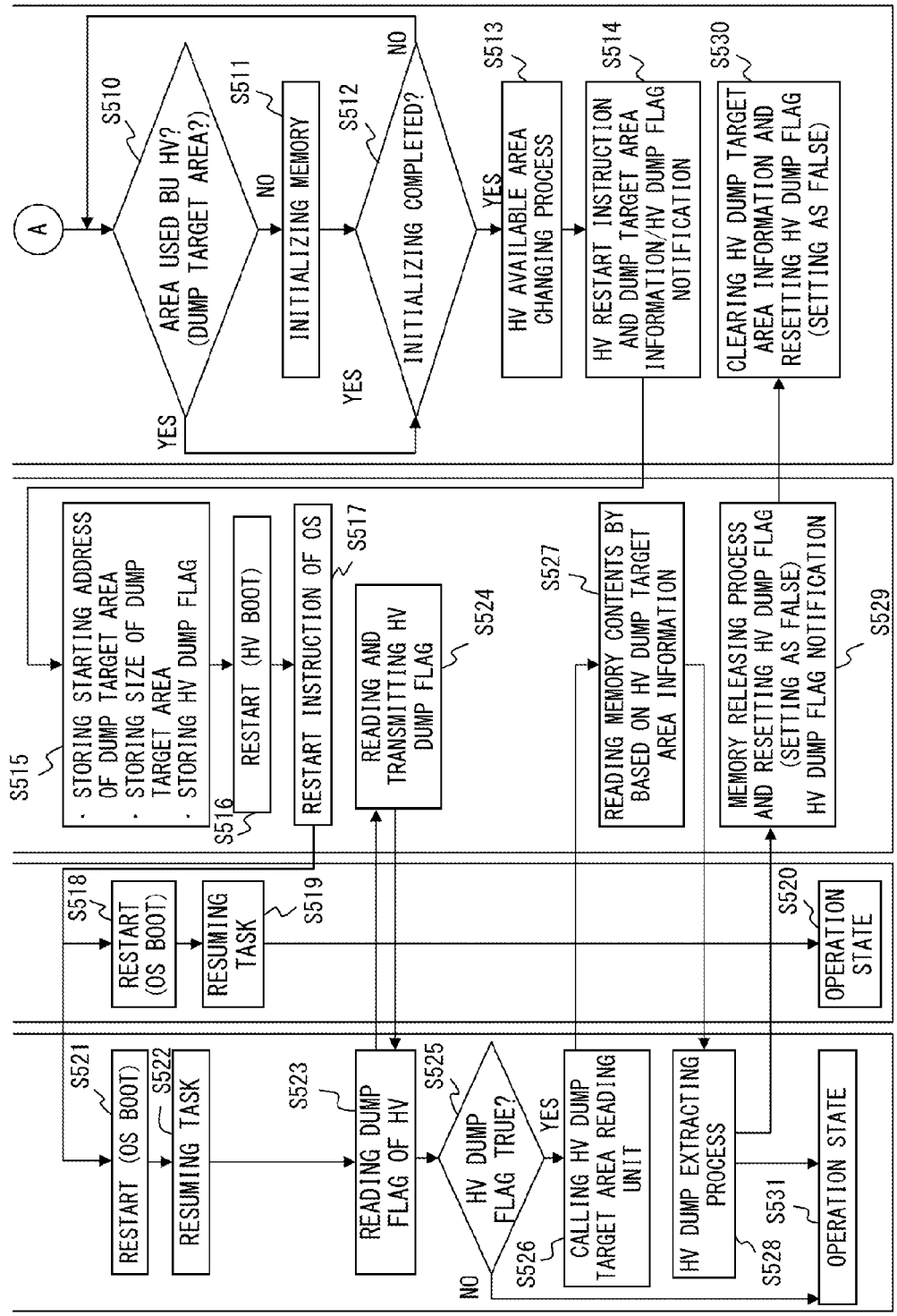
FIG. 7B is a flowchart of the memory dump generating process according to the first embodiment.

FIGS. 7A and 7B are flowcharts of the memory dump generating process according to the first embodiment.

It is assume that, in the initial state, the domains 201-1 through 201-3 and the OS 401-1 through 401-3 have been started and entered an operation state, and the domains 201-4 and the OS 401-4 have not been started.

In step S501, the hypervisor 351 detect a fatal error.

In step S502, the domain emergency stop direction unit 352 instructs the logical domains in the operation state, that is, the control domain 201-1 and the domains 201-2 and 201-3, to perform an emergency stop.

In step S503, the OS 401-i (i=1~3) receives the emergency stop instruction, and performs the emergency stop for the OS 401-i.

In step S504, the HV dump target area notifying unit 354 reads the HV dump target area information from the HV dump target area information/HV dump flag storage area 356, and notifies the firmware 311 of the information. The HV dump target area information indicates the memory area (dump target area) used by the hypervisor 351, and includes the information about the starting address (PA base) and the size of the memory area. The HV dump target area information is in the format illustrated in FIG. 8, and indicates a block number, a starting address (PA base) of the physical memory of a block, and the size of the block. The HV restarting unit 357 stops the hypervisor 351 (HV abort).

In step S506, the dump target area information/HV dump flag storing unit 312 receives the HV dump target area information.

In step S507, the dump target area information/HV dump flag storing unit 312 stores the received HV dump target area information as dump target area information in the dump target area information/HV dump flag storage area 313. The HV dump flag setting unit 314 sets the HV dump flag as true, and stores it in the dump target area information/HV dump flag storage area 313.

In step S508, the firmware 311 starts the restarting process of a physical partition while holding the contents of the memory.

In step S509, the memory initializing unit 315 starts initializing the memory. First, for example, the leading address of the memory is set as the area to be initialized.

In step S510, the memory initializing unit 315 refers to the dump target area information, and judges whether or not the area to be initialized is the area specified by the dump target area information, that is, the dump target area. If the area to be initialized is the dump target area, control is passed to step S512 while holding the contents of the area to be initialized. If it is not the dump target area, control is passed to step S511.

In step S511, the memory initializing unit 315 initializes the area to be initialized.

In step S512, the memory initializing unit 315 judges whether or not the initializing process has been performed on all areas other than the dump target area. If the initializing process has been performed on all areas other than the dump target area, control is passed to step S513. If the initializing process has not been performed on all areas other than the dump target area, an unprocessed area (for example, the address of the area after the area checked as to whether or not it is a dump target area) is defined as an area to be initialized, and control is returned to step S510.

In step S513, the HV available area change unit 316 changes the area used by the hypervisor 351 into an area other than the area indicated by the dump target area information. As the area to be initialized, at least an area which has been changed and is to be used by the hypervisor 351 may be defined as an area to be initialized.

In step S514, the HV restart instruction unit 317 instructs the hypervisor 351 to make a restart. The dump target area information/HV dump flag notification unit 318 reads the dump target area information and the HV dump flag from the dump target area information/HV dump flag storage area 313, and notifies the hypervisor 351 of it.

In step S515, the HV dump target area information/HV dump flag storing unit 355 receives the dump target area information and the HV dump flag, and stores them in the HV dump target area information/HV dump flag storage area 356. The HV dump target area information/HV dump flag storing unit 355 stores the received dump target area information as the HV dump target area information.

In step S516, the HV restarting unit 357 restarts the hypervisor 351. However, the memory area specified by the HV dump target area information is not used.

In step S517, the OS restart instruction unit 358 instructs the OS 401-1 through 401-3 to make a restart.

In step S518, the OS restarting units 409-2 and 409-3 respectively restart the OS 401-2 and 401-3.

In step S519, the OS 401-2 and 401-3 restart the task.

In step S520, the OS 401-2 and 401-3 enter the normal operation state.

In step S521, the OS restarting unit 409-1 restarts the OS 401-1.

In step S522, the OS 401-1 resumes the task.

In step S523, the HV memory dump judgment unit 408-1 requests the hypervisor 351 to transmit an HV dump flag.

In step S524, upon receipt of the request, the HV memory dump flag read and transmission unit 359 reads the HV dump flag from the HV dump target area information/HV dump flag storage area 356, and transmits it to the OS 401-1.

In step S525, the HV memory dump judgment unit 408-1 receives the HV dump flag, and judges whether or not the HV dump flag is true. If the HV dump flag is true, control is passed to step S527. If it is false, control is passed to step S531.

In step S526, the calling unit 410-1 of the HV dump target area reading unit calls the HV dump target area reading unit 360.

In step S527, the HV dump target area reading unit 360 reads the contents of the memory area indicated by the HV dump target area information, and transmits it to the control domain.

In step S528, the HV dump unit 412-1 receives the memory contents read by the HV dump target area reading unit 360 from the HV dump target area reading unit 360, writes the received memory contents to a file, and generates a dump file. Then, the processes in steps S529, S530, and S531 are performed in parallel.

In step S529, the memory releasing unit 362 releases the memory area specified by the HV dump target area information. In addition, the HV dump flag resetting unit 363 resets an HV dump flag, that is, sets it as false. The HV dump flag notification unit 364 notifies the firmware 311 of the HV dump flag.

In step S530, the memory releasing unit 320 clears the dump target area information. In addition, the HV dump flag resetting unit 321 resets the HV dump flag, that is, sets the flag as false.

In step S531, the OS 401-1 enters the normal operation state.

In the memory dump generating process according to the first embodiment, when an error is detected and a hypervisor and an operating system are restarted, no copying process is performed to another memory unit etc. although the memory dump is large in size, thereby enabling the hypervisor and the operating system to be quickly restarted. Thus, the task may be stopped in a shorter time.

Described below is a variable example of the memory dump generating process according to the first embodiment.

In the variable example, the memory dump of the hypervisor being operated is extracted (referred to as a live dump of a hypervisor).

Figure 7C:
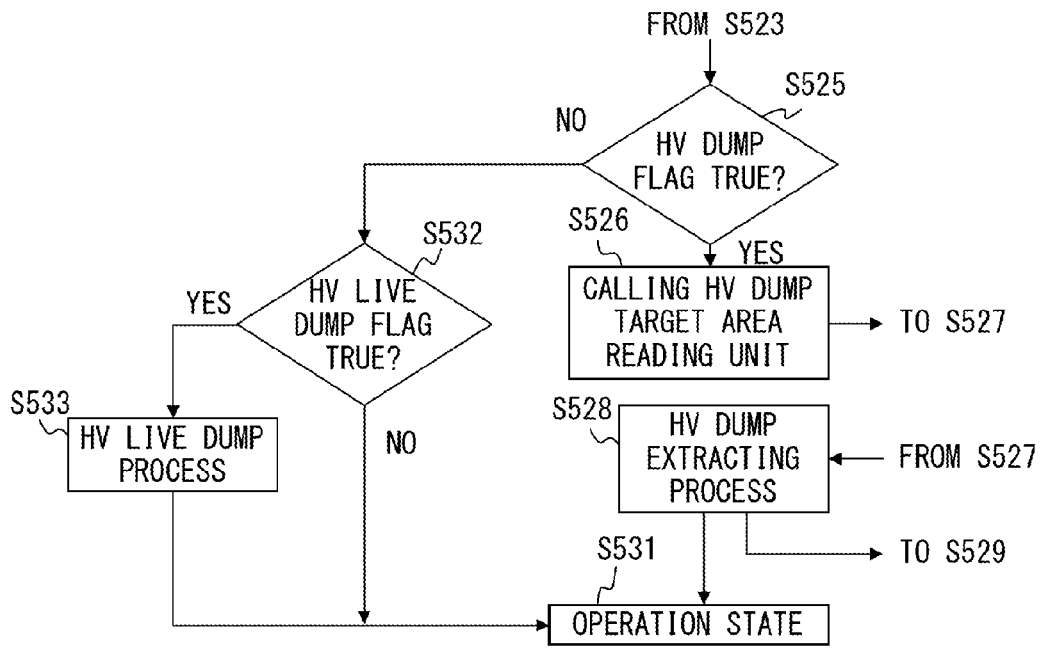
FIG. 7C is a flowchart of a variation example of the memory dump generating process according to the first embodiment.

FIG. 7C is a flowchart of a variation example of the memory dump generating process according to the first embodiment.

In the flowchart of the variable example, steps S532 and S533 are added to the flowchart of the memory dump generating process according to the first embodiment in FIGS. 7A and 7B, and control is passed to step S532 when it is judged NO in step S525.

In FIG. 7C, the changes to FIGS. 7A and 7B are added, and the same other parts are omitted.

In the variable example, a change may be made so that, for example, the data structure of the HV dump flag is set to: 0 indicating that no extraction is performed; 1 indicating the HV dump in an abnormal condition; 2 indicating the HV live dump; etc. The HV memory dump judgment unit 408-1 judges that the HV dump flag is true when the HV dump flag is 1, and judges that the HV dump flag is false when the HV dump flag is 0 or 2. In addition, the HV memory dump judgment unit 408-1 judges that the HV live dump flag is true when the HV dump flag is 2.

In step S532, the HV memory dump judgment unit 408-1 judges whether or not the HV live dump flag is true. If the HV live dump flag is true (that is, when the HV dump flag is 2), control is passed to step S533. If it is false, control is passed to step S531.

In step S533, the HV live dump process is performed. In detail, the calling unit 410-1 of the HV dump target area reading unit calls the HV dump target area reading unit 360. The HV dump target area reading unit 360 reads the contents of the memory area used by the hypervisor 351 being operated, and transmits the contents to the control domain. The HV dump unit 412-1 receives the memory contents read by the HV dump target area reading unit 360, and writes the received memory contents to a file, thereby generating a dump file of a hypervisor.

As described above, when the memory dump of the hypervisor being operated is extracted, the data of the memory area used by the hypervisor is read without stopping or restarting the hypervisor, and is written to a file as a dump file of the hypervisor.

(Second Embodiment)

In the second embodiment, the memory dump of the kernel of the OS is extracted in addition to the memory dump of a hypervisor.

Figure 9A:
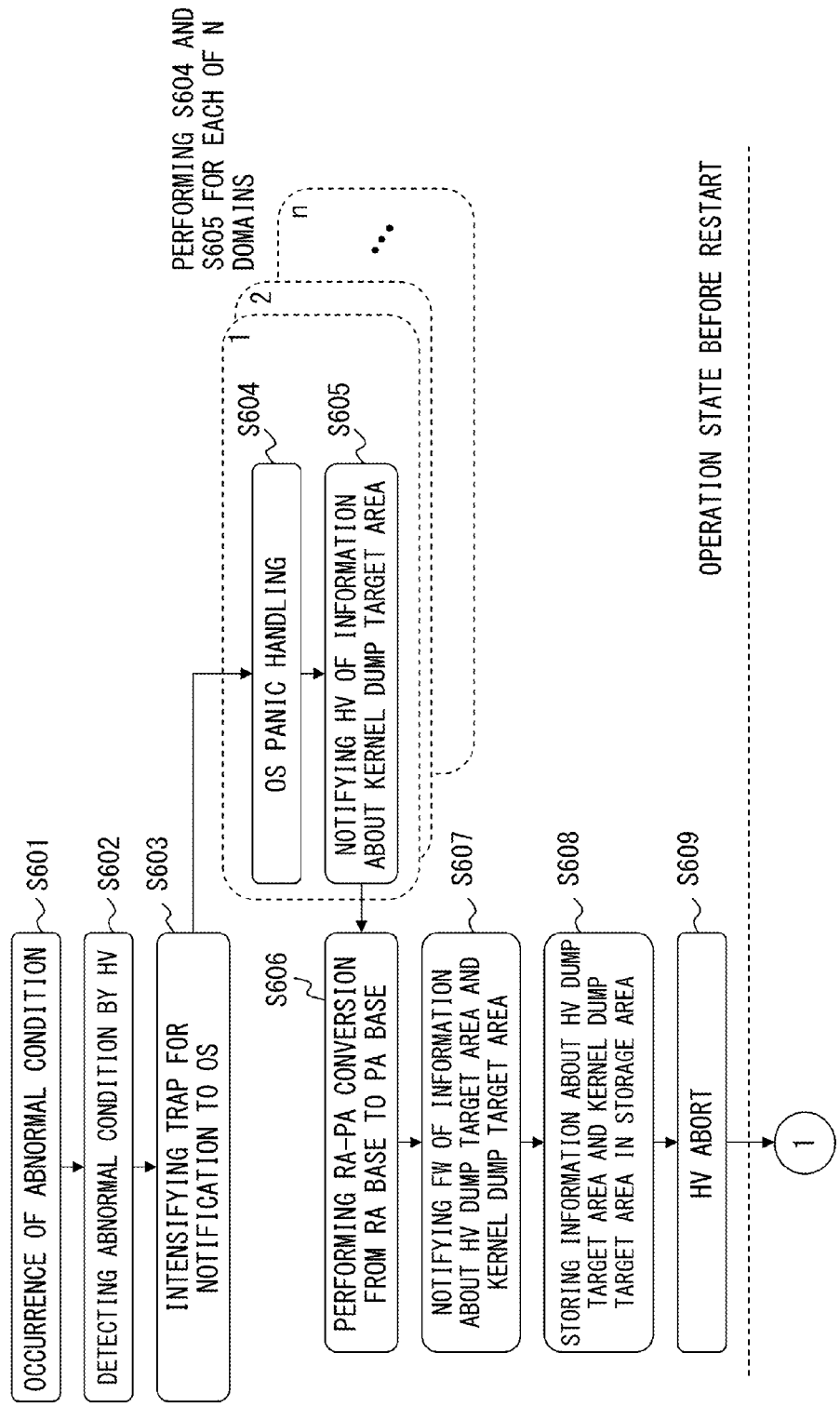
FIG. 9A is a flowchart of the memory dump generating process according to the second embodiment.
Figure 9B:
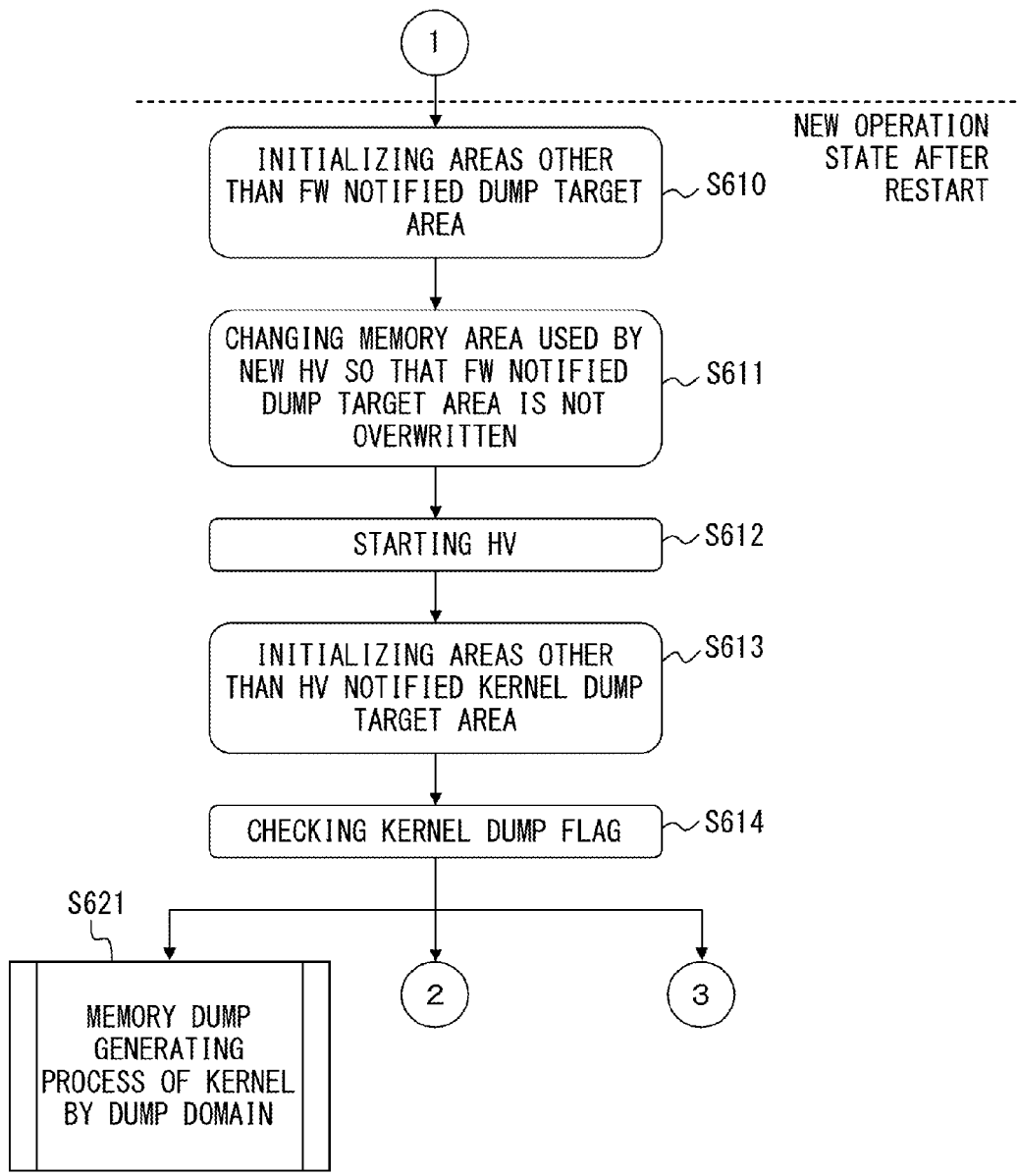
FIG. 9B is a flowchart of the memory dump generating process according to the second embodiment.
Figure 9C:
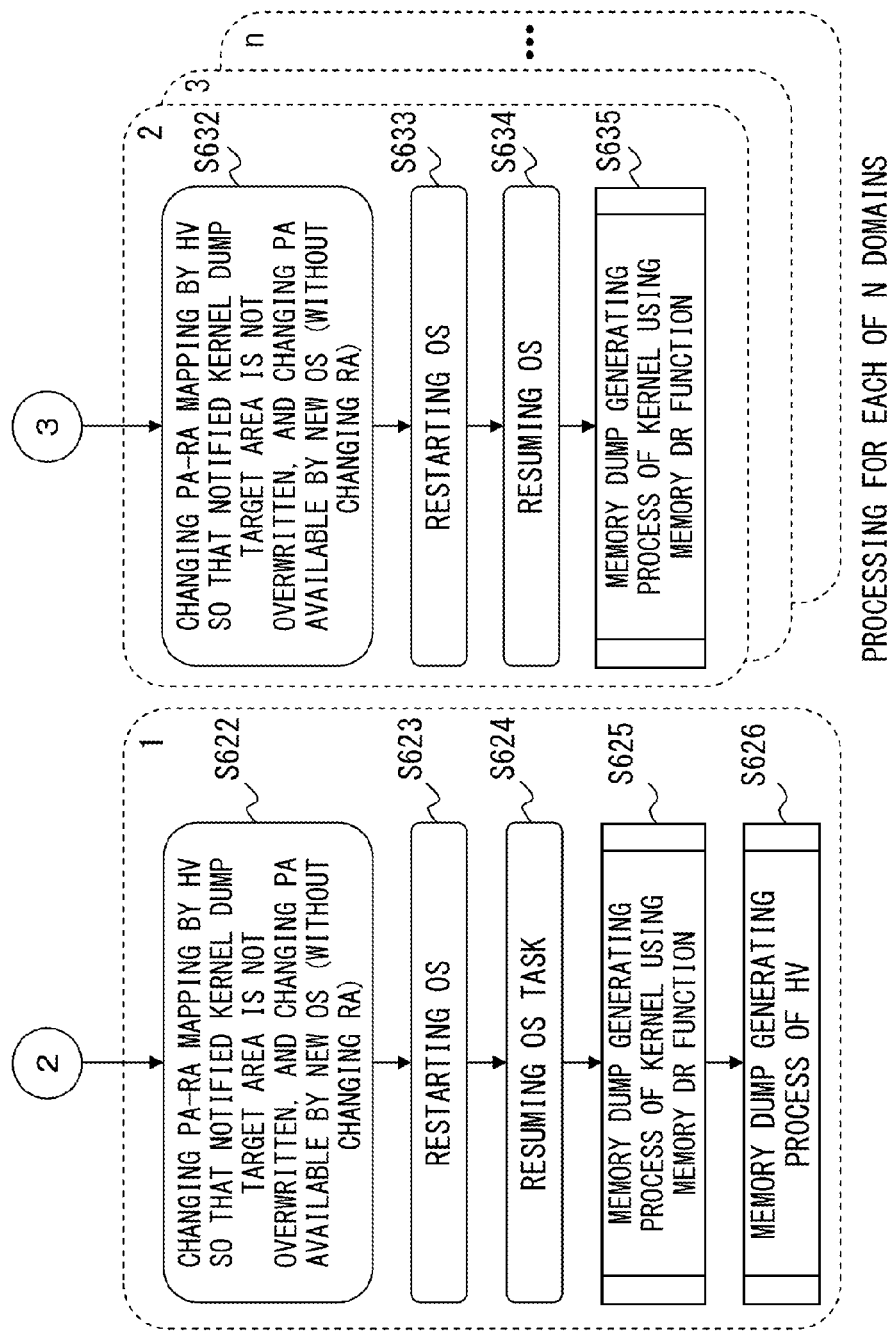
FIG. 9C is a flowchart of the memory dump generating process according to the second embodiment.

FIGS. 9A, 9B, and 9C are flowcharts of the memory dump generating process according to the second embodiment.

In the initial state, it is assumed that the domains 201-1 through 201-3 and the OS 401-1 through 401-3 are started and enter the operation state, and the domain 201-4 and the OS 401-4 are not started.

In step S601, a fatal error occurs in the hypervisor 351.

In step S602, the hypervisor 351 detects the fatal error.

In step S603, the interrupting unit 370 notifies the OS in the operation state, that is, the OS 401-i (i=1~3) of the interrupt processing, and the OS panic direction unit 353 instructs the OS 401-i to perform the panic handling.

In step S604, the panic handling unit 414-i receives the panic instruction, and handles the panic of the OS 401-i.

In step S605, the kernel dump target area notifying unit 415-i notifies the hypervisor 351 of the kernel dump target area information. The kernel dump target area information indicates the memory area (dump target area) used by the kernel of the OS 401-i, and includes the information about the starting address (RA base) and the size of the memory area. The kernel dump target area information is in the format illustrated in FIG. 10, and is associated with a block number, the starting address (RA base) of the memory of a block, and the size of a block.

Steps S604 and S605 are executed for each logical domain which has received the panic direction.

In step S606, the PA-RA mapping unit 368 performs a RA-PA conversion for converting the notified starting address (RA base) to the starting address (PA base) of the PA base from the RA base.

In step S607, the HV dump target area notifying unit 354 notifies the firmware 311 of the HV dump target area information indicating the memory area used by the hypervisor 351. Furthermore, the HV dump target area notifying unit 354 notifies the firmware 311 of the kernel dump target area information received from the OS 401-i. The notified kernel dump target area information includes the starting address (PA base) converted from the RA base to the PA base, and the size. In the present embodiment, three pieces of kernel dump target area information corresponding to the stopped logical domain are notified.

In step S608, the dump target area information/HV dump flag storing unit 312 stores the received HV dump target area information and the received kernel dump target area information as dump target area information in the dump target area information/HV dump flag storage area 313. Furthermore, the HV dump flag setting unit 314 sets the HV dump flag as true, and stores it in the dump target area information/HV dump flag storage area 313.

In step S609, the HV restarting unit 357 stops the hypervisor 351 (HV abort).

In step S610, the memory initializing unit 315 initializes the memory area other than the area indicated by the dump target area information. That is, the memory initializing unit 315 initializes the memory area other than the area used by the hypervisor 351 and the area used by the kernel of the OS 401-i at the panic.

In step S611, the HV available area change unit 316 changes the area used by the hypervisor 351 into an area other than the area indicated by the dump target area information. The HV restart instruction unit 317 directs the hypervisor 351 to make a restart. The dump target area information/HV dump flag notification unit 318 reads the dump target area information and the HV dump flag from the dump target area information/HV dump flag storage area 313, and notifies the hypervisor 351 of them. The dump target area information includes the HV dump target area information and the kernel dump target area information. The HV dump target area information/HV dump flag storing unit 355 receives the HV dump target area information in the dump target area information and the HV dump flag, and stores them in the HV dump target area information/HV dump flag storage area 356. The kernel dump target area information/kernel dump flag storing unit 366 receives the kernel dump target area information in the dump target area information, and stores it in the kernel dump target area information/kernel dump flag storage area 367.

In step S612, the HV restarting unit 357 starts the hypervisor 351.

In step S613, the memory initializing unit 372 initializes the memory area other than the area indicated by the kernel dump target area information.

In step S614, the PA-RA mapping unit 368, the OS restart instruction unit 358, and the dump dedicated domain starting unit 365 check the value of the kernel dump flag. The process corresponding to the value of the kernel dump flag is performed. For example, when the kernel dump flag is "1 indicating that the dump is extracted in the dump domain", the PA-RA mapping unit 368 assigns the PA of the memory used by the kernel of the OS 401-1 through 401-3 at the panic to the RA of the dump domain 204-4.

The processes in steps S621, S622 through S626, and S632 through S635 are separately performed in parallel.

However, when the kernel dump flag is "1 indicating that the dump is extracted in the dump domain", steps S626 and S635 are not performed. When the kernel dump flag is "2 indicating that the dump is extracted using the memory dynamic reconfiguration function", step S621 is not performed.

In this example, step S621 is the process relating to the dump domain 204-4, steps S622 through S626 are the processes relating to the control domain 204-1, and steps S632 through S635 are processes relating to the logical domains 204-2 and 204-3.

In step S621, the memory dump generating process of the kernel is performed in the dump domain. The details of the memory dump generating process of the kernel in the dump domain are described later.

In step S622, the PA-RA mapping unit 368 changes the mapping between the physical address (PA) and the real address (RA) of the domain 201-1 as described in 1) and 2) below. Thus, the data of the memory area used the kernel at the panic and by the hypervisor 351 at the panic is not overwritten although the OS 401-1 is restarted.

1) The physical address of the memory used by the kernel and the hypervisor at the occurrence of the panic is not to be assigned to the real address of the domain to be restarted, and 2) The change of the memory size available in the domain is to be suppressed before and after the restart.

However, when the physical memory assignable to the domain to be restarted is smaller than a specified value, 1) above is prioritized.

Which area the kernel and the hypervisor 351 was used at the occurrence of the panic is judged with reference to the HV dump target area information and the kernel dump target area information.

In step S623, the OS restart instruction unit 358 directs the OS 401-1 to make a restart. The OS restart instruction unit 358 includes the memory dump generating process of the kernel using the memory DR function in the restart direction when the kernel dump flag is "2 indicating that the dump is extracted using the memory dynamic reconfiguration function". Upon receipt of the direction, the OS starting unit 409-1 starts the OS 401-1.

In step S624, the OS 401-1 resumes the task.

In step S625, the memory dump generating process of the kernel is performed using the memory dynamic reconfiguration (DR) function. The details of the memory dump generating process of the kernel using the memory DR function are described later. In step S626, the memory dump generating process of the hypervisor is performed. The explanation of step S626 is omitted here because it is similar to that of the processes in steps S523 through S531 in FIG. 7B.

In step S632, the PA-RA mapping unit 368 changes the mapping between the physical address (PA) and the real address (RA) of the domains 201-2 and 201-3 as described in 1) and 2) below. Thus, the data of the memory area used the kernel at the panic and by the hypervisor 351 at the panic is not overwritten although the OS 401-1 is restarted.

1) The physical address of the memory used by the kernel and the hypervisor at the occurrence of the panic is not to be assigned to the real address of the domain to be restarted, and 2) The change of the memory size available in the domain is to be suppressed before and after the restart.

However, when the physical memory assignable to the domain to be restarted is smaller than a specified value, 1) above is prioritized.

Which area the kernel and the hypervisor 351 was used at the occurrence of the panic is judged with reference to the HV dump target area information and the kernel dump target area information.

In step S633, the OS restart instruction unit 358 directs the OS 401-2 and 401-3 to make a restart. The OS restart instruction unit 358 includes the memory dump generating process of the kernel using the memory DR function in the restart direction when the kernel dump flag is "2 indicating that the dump is extracted using the memory dynamic reconfiguration function". Upon receipt of the direction, the OS starting units 409-2 and 409-3 start the OS 401-2 and 401-3 respectively.

In step S634, the OS 401-2 and 401-3 resume the respective tasks.

In step S635, the memory dump generating process of the kernel is performed using the memory DR function.

The details of the memory dump generating process of the kernel are described below.

The memory dump generating process of the kernel may be (1) the method of dumping memory in the dump domain (step S621) or (2) the method of dumping memory dump using the memory dynamic reconfiguration function (steps S626 and S635).

(1) Method of Dumping Memory in the Dump Domain

The dump domain 201-4 is not to be provided for each logical domain in a system including a plurality of domains 201. That is, one dump domain 201-4 may be used on one system. When there is one dump domain 201-4, the memory dump is extracted for each domain when a panic occurs simultaneously in a plurality of logical domains 201. However, since the task may be quickly resumed regardless of the completion of the dump extraction, there is no influence on the task.

Since the task in the logical domain in which a panic has occurred is not to be inherited in the dump domain 201-4, only the following hardware resources are requested to dump the memory.

The physical memory area used at the panic by the kernel of the OS of the logical domain in which the panic has occurred One or more CPUs The disk which stores a dump file and the I/O resources requested to use the disk.

FIG. 11 is a flowchart of the memory dump generating process of a kernel in a dump domain.

FIG. 11 corresponds to step S621 in FIG. 9B.

Described below is the memory dump generating process of the kernel of the OS 401-i.

In step S651, the dump dedicated domain starting unit 365 starts the dump domain 201-4 in the firmware mode. The firmware mode does not starts the OS, that is, stops before starting the OS. By not starting the OS, the dump target area is prevented from being rewritten.

In step S652, the kernel dump target memory reading unit 411-4 reads the memory area (kernel dump target area) used by the kernel of the operating system 401-i at the occurrence of the panic. The information about the kernel dump target area (starting address (RA base), size, etc.) is obtained by the notification from the firmware 311 or the hypervisor 351.

In step S653, the kernel dump unit 413-4 writes the read memory contents to a file, thereby generating a dump file.

In step S654, the dump dedicated domain stopping unit 419-4 stops the dump domain 201-4. Then, the dump dedicated domain stopping unit 419-4 notifies the memory management unit 361 of the hypervisor 351 so that the kernel dump target area may be available and unused memory, that is, blank memory. The kernel dump flag resetting unit 420-4 directs the hypervisor 351 to reset the kernel dump flag. Upon receipt of the reset direction, the kernel dump flag resetting unit 373 resets the kernel dump flag.

In step S655, the memory management unit 361 sets the kernel dump target area as blank memory available from another logical domain 201-i.

Figure 12:
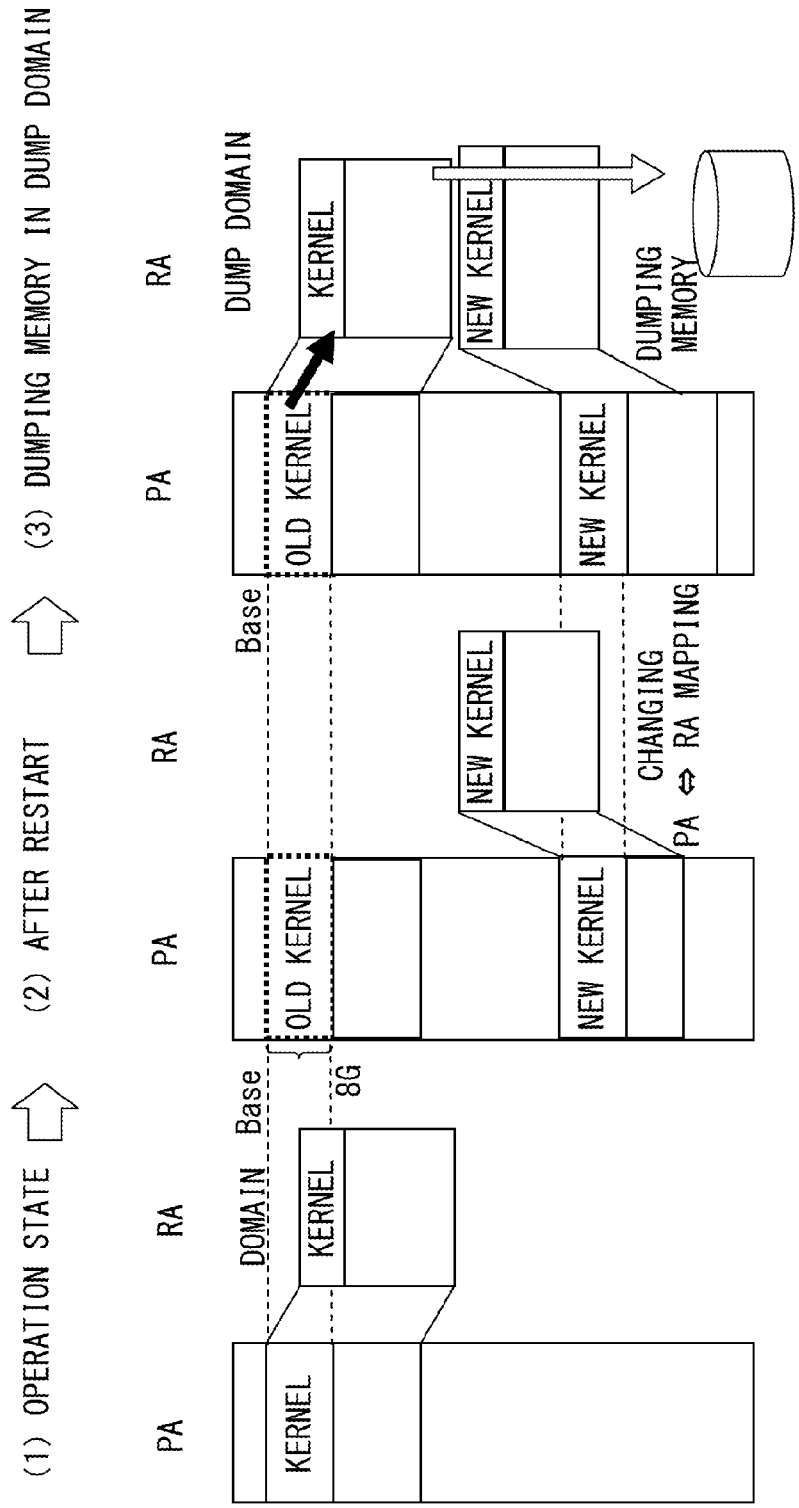
FIG. 12 illustrates dumping memory in a dump domain.

FIG. 12 illustrates dumping memory in a dump domain.

The left, central, and right parts of FIG. 12 respectively illustrate the operation state (and the panic state), the state after the restart, and the extraction of the memory dump in the dump domain.

The process in the logical domain 201-i is described. Since similar processes are performed in the domains 201-2 and 201-3, the details are omitted.

In the operation state illustrated at the left part in FIG. 12, the area of the PA is mapped at the area of the RA of the logical domain 201-1.

The area used by the kernel of the OS 401-1 at the panic of the OS 401-1 is a kernel dump target area.

After the panic of the OS 401-1, the PA-RA mapping is changed (step S622), and the logical domain 201-1 is assigned the area of the PA different from the area (kernel dump target area) used by the kernel of the OS 401-1 at the panic, and the OS 401-1 is restarted (center in FIG. 12).

At the dump illustrated on the right in FIG. 12, the RA of the dump domain 201-4 is assigned the area (kernel dump target area) of the PA used by the kernel of the OS 401-1. The dump domain 201-4 reads the kernel dump target area, and generates a dump file.

FIG. 13 illustrates PA-RA mapping information in dumping memory in a dump domain.

The left, central, and right parts in FIG. 13 respectively illustrate the operation state (and panic state), the dump operation, and the state after the dump.

Described below is the PA-RA mapping in the domain 201-1 (control domain #0) and the dump domain 201-4 (dump extraction dedicated domain #3).

The PA-RA mapping information is described as associating a domain, a starting address (PA base), size, and a starting address (RA base).

At the panic on the left in FIG. 13, the area having the starting address (PA base) of xxxxx and the size of 8 GB is mapped at the area having the starting address (PA base) of the control domain #0 of aaaaa (corresponding to the left part in FIG. 12). The area is a kernel dump target area.

After the panic of the OS 401-1, the PA-RA mapping is changed (step S622), and the PA-RA mapping information is expressed at the center of FIG. 13.

At the dump illustrated at the center in FIG. 13, the area having the starting address (PA base) of xxxxx and the size of 8 GB is mapped at the area having the starting address (RA base) of the dump extraction dedicated domain #3 of aaaaa. That is, the area of the PA of the control domain #0 at the panic is mapped at the RA of the dump extraction dedicated domain #3. Furthermore, the area having the starting address (PA base) of yyyyy and the size of 8 GB is mapped at the area having the starting address (PA base) of the control domain #0 of aaaaa. That is, the area of a new PA is assigned to the control domain #0 after the restart (corresponding to the right in FIG. 12).

After generating the dump file, the kernel dump target area becomes blank memory available from another domain (step S655).

That is, after the dump on the right in FIG. 13, the mapping information in the dump extraction dedicated domain #3 is deleted.

In the method of dumping memory in the dump extraction dedicated domain, the dump is extracted in another domain, not in the domain in which an abnormal condition is detected. Therefore, there is a low possibility that a secondary damage such as a hang-up after an abnormal condition is detected during the dump process occurs.

In the method of dumping memory in the dump domain, it is easily realized to suppress charging on hardware resources used in dumping memory in a system in which a charge is imposed depending on the amount and time of the hardware resources (CPU, memory, disc, etc.) used by a user such as capacity on demand (CoD) etc., thereby conducting appropriate charging.

(2) Method of Dumping Memory Using the Memory Dynamic Reconfiguration Function

Described below is the process (step S625) in the logical domain 201-1. Since the processes (in step S635) in the logical domains 201-2 and 201-3 are similar, the detailed descriptions are omitted here.

FIG. 14 is a flowchart of the memory dump generating process of the kernel using a memory dynamic reconfiguration function.

FIG. 14 corresponds to step S625 in FIG. 9C.

In step S641, the memory DR attaching unit 416-1 attaches the memory area (kernel dump target area) used by the kernel of the OS 401-1 at the occurrence of the panic into the domain 201-1 using the dynamic reconfiguration function of memory. The information (starting address (RA base), size, etc.) about the kernel dump target area is obtained by the notification of the firmware 311 or the hypervisor 351.

In step S642, the kernel dump target memory reading unit 411-1 reads the attached memory area.

In step S643, the kernel dump unit 413-1 writes the read memory contents to a file, thereby generating a dump file.

In step S644, the memory DR detaching unit 417-1 detaches from the domain 201-1 the memory area used by the kernel of the OS 401-1 using the memory dynamic reconfiguration function, and notifies the memory management unit 361 so that the detached area may be blank memory. Furthermore, the kernel dump flag resetting unit 420-1 directs the hypervisor 351 to reset a kernel dump flag. Upon receipt of the reset direction, the kernel dump flag resetting unit 373 resets the kernel dump flag.

In step S645, the memory management unit 361 sets the detached area as blank memory available from other domains 201-1 and 201-3.

In addition, instead of steps S644 and S645, the blank memory adding unit 418-1 notifies the memory management unit 402-1 so that the memory area which has been used by the kernel of the OS 401-1 (that is, the dumped area) as unused available memory, that is, blank memory, and the memory management unit 402-1 may perform the process for using the dumped area as blank memory.

Figure 15:
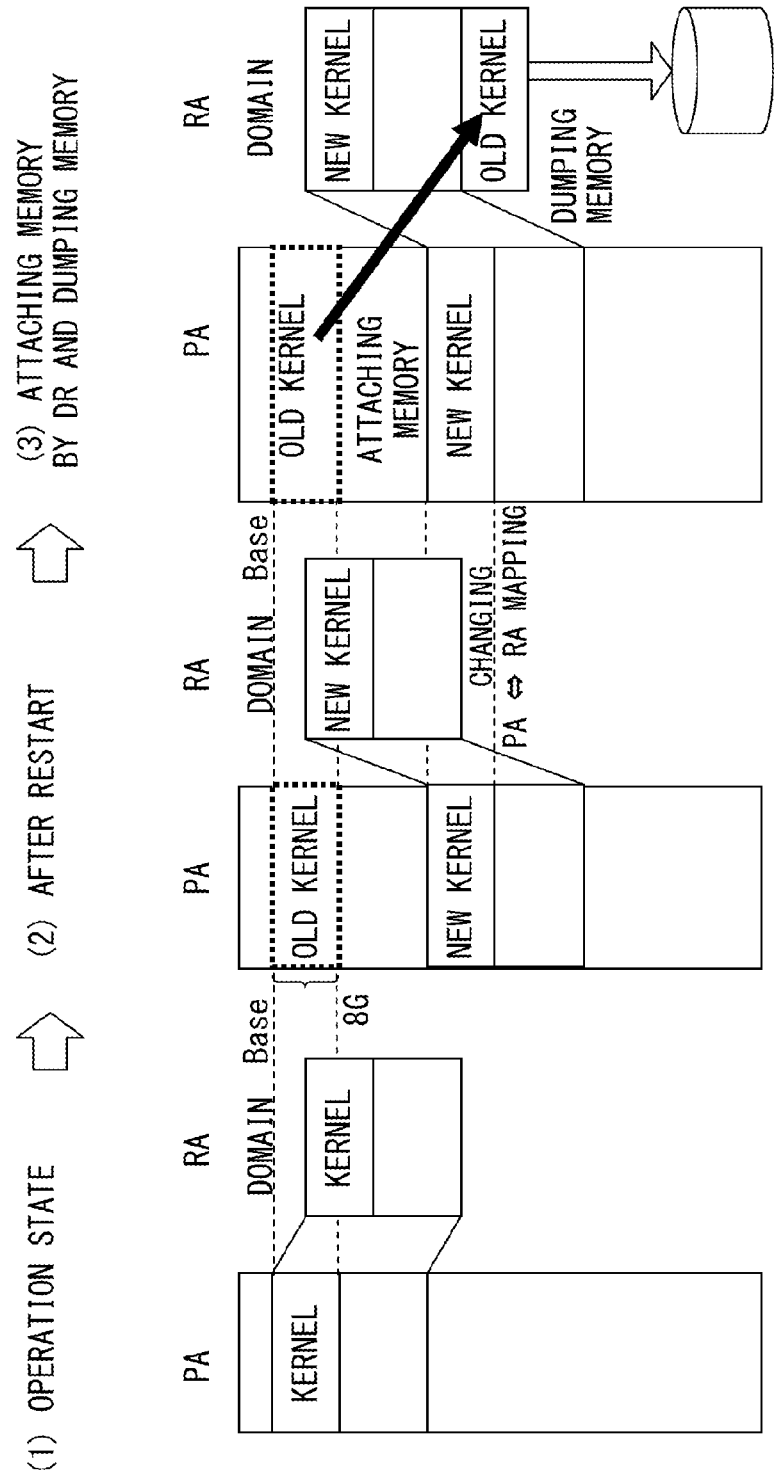
FIG. 15 illustrates dumping memory using a memory dynamically reconfiguration function.

FIG. 15 illustrates dumping memory using a memory dynamically reconfiguration function.

The left, central, and right parts of FIG. 15 respectively illustrate the operation state (and the panic state), the state after the restart, and the extraction of the memory dump in the dump domain.

The process in the domain 201-i is described. Since similar processes are performed in the domains 201-2 and 201-3, the details are omitted.

In the operation state illustrated at the left part in FIG. 15, the area of the PA is mapped at the area of the RA of the logical domain 201-1.

The area used by the kernel of the OS 401-1 at the panic of the OS 401-1 is a kernel dump target area.

After the panic of the OS 401-1, the PA-RA mapping is changed (step S622), and the RA of the domain 201-1 is assigned the area of the PA different from the area (kernel dump target area) used by the kernel of the OS 401-1 at the panic, and the OS 401-1 is restarted (center in FIG. 15).

At the dump after the restart illustrated on the right in FIG. 15, the area (kernel dump target area) used by the kernel of the OS 401-1 at the panic is attached into the RA of the domain 201-1. The domain 201-1 reads the kernel dump target area, and generates a dump file.

FIG. 16 illustrates PA-RA mapping information in dumping memory using the memory dynamic reconfiguration function.

The left, central, and right parts in FIG. 16 respectively illustrate the operation state (and panic state), the dump operation, and the state after the dump.

Described below is the PA-RA mapping in the domain 201-1 (control domain #0).

The PA-RA mapping information is described as associating a domain, a starting address (PA base), size, and a starting address (RA base).

At the panic on the left in FIG. 16, the area having the starting address (PA base) of xxxxx and the size of 8 GB is mapped at the area having the starting address (RA base) of the control domain #0 of aaaaa (corresponding to the left part in FIG. 15). The area is a kernel dump target area.

After the panic of the OS 401-1, the PA-RA mapping is changed, the kernel dump target area is attached into the control domain #0, and the PA-RA mapping information is expressed at the center of FIG. 16.

At the dump illustrated at the center in FIG. 16, the area having the starting address (PA base) of yyyyy and the size of 8 GB is mapped at the area having the starting address (RA base) of the RA of the control domain #0 of aaaaa. Furthermore, the area having the starting address (PA base) of xxxxx and the size of 8 GB is mapped at the area having the starting address (RA base) of the control domain #0 of bbbbb.

That is, the area of a new PA is assigned to the control domain #0 after the restart, and the kernel dump target area is attached into the control domain #0 after the restart of the control domain #0 (corresponding to the right in FIG. 15).

After generating the dump file, the kernel dump target area becomes blank memory available from another domain (step S645).

That is, after the dump on the right in FIG. 16, the mapping information in the kernel dump target area is deleted.

In the method of dumping memory using the memory dynamic reconfiguration function, since a new operating system after a restart, not an operating system which has detected an abnormal condition, extracts a dump, there is a low possibility that a secondary damage such as a hang-up etc. occurs after detecting an abnormal condition again during the dump process.

In the memory dump generating process according to the second embodiment, when an error is detected and a hypervisor and an operating system are restarted, no copying process is performed in another memory unit etc. although a memory dump is large, thereby enabling the select and the operating system to be quickly restarted. Thus, a task stop time may be shorter.

In the memory dump generating process according to the second embodiment, an error caused by both of a hypervisor and a domain may be effectively analyzed by dumping memory of the hypervisor and the kernel.

(Third Embodiment)

In the third embodiment, an error is detected in the operating system, and a memory dump of the kernel is extracted.

Described below is the case in which a memory dump of the kernel of the OS 401-1 is generated.

Figure 17:
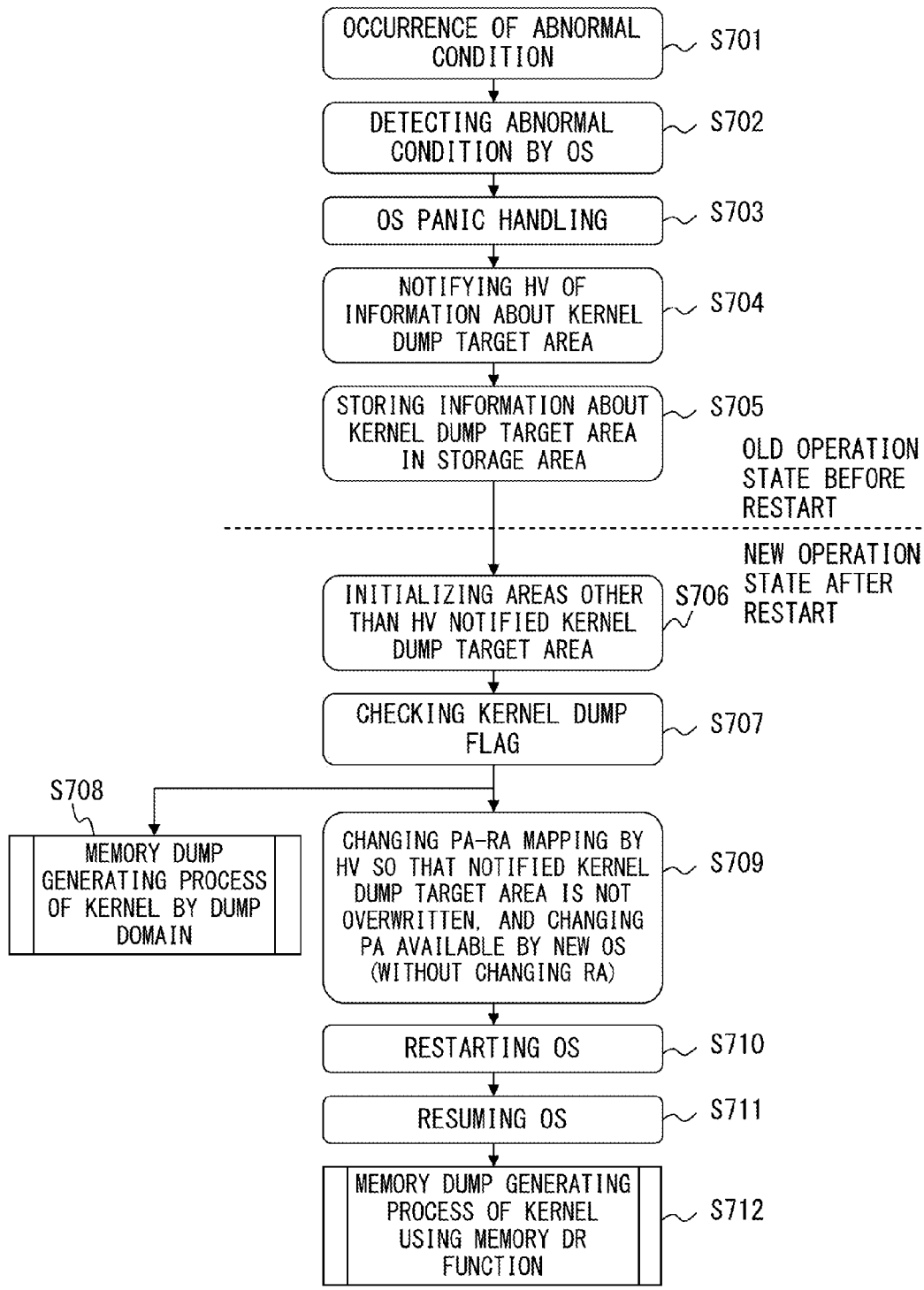
FIG. 17 is a flowchart of the memory dump generating process according to the third embodiment.

FIG. 17 is a flowchart of the memory dump generating process according to the third embodiment.

First, the memory management unit 402-1 assigns the memory used by the kernel from the smallest (or largest) real address (RA) in the memory 203-1 when the OS 401-1 is started. Thus, the memory area (dump target area) used by the kernel is made the smallest possible. In addition, the mapping information extracting and storing unit 406-1 writes the information required to extract/analyze the dump of the memory used by the kernel (for example, the mapping information about each segment such as the text area, the data area, the heap area, the stack area, etc. of the kernel (logical address, physical address, size, etc.), the mapping information about an address conversion table, a page table, various control tables) to the mapping information storage area 407-1. Furthermore, it is assumed that the logical domains 201-1 through 201-3 and the OS 401-1 through 401-3 are started and enter the operation state, and the logical domains 201-4 and the OS 401-4 are not started.

In step S701, a fatal error occurs in the OS 401-1.

In step S702, the OS 401-1 detects the fatal error.

In step S703, the panic handling unit 414-1 handles the panic (emergency shut down) of the OS 401-1.

In step S704, the kernel dump target area notifying unit 415-1 notifies the hypervisor 351 of the information (kernel dump target area information) about the memory area (kernel dump target area) used by the kernel of the OS 401-1 at the emergency shut down (panic). Furthermore, the kernel dump flag notifying unit 421-1 notifies the hypervisor 351 of the kernel dump flag.

In step S705, the kernel dump target area information/kernel dump flag storing unit 366 stores the received kernel dump target area information and kernel dump flag in the kernel dump target area information/kernel dump flag storage area 367.

In step S706, the memory initializing unit 372 initializes the memory areas other than the area indicated by the kernel dump target area information. That is, the memory initializing unit 372 does not perform the initializing process (that is, does not update data) on the memory area used by the kernel of the OS 401-1 at the panic. Thus, the data of the memory area used by the kernel of the OS 401-1 at the panic remains as is.

In step S707, the PA-RA mapping unit 368, the OS restart instruction unit 358, and the dump dedicated domain starting unit 365 check the value of the kernel dump flag. The process is performed depending on the value of the kernel dump flag. For example, the PA-RA mapping unit 368 assigns the PA of the memory used by the kernel of the OS 401-1 through 401-3 at the occurrence of the panic to the RA of the dump domain 204-4 when the kernel dump flag is "1 indicating that the dump is extracted in the dump domain".

The processes in steps S708 and S709 through 712 are separately performed in parallel.

However, when the kernel dump flag is "1 indicating that the dump is extracted in the dump domain", step S712 is not performed. When the kernel dump flag is "2 indicating that the dump is extracted using the memory dynamic reconfiguration function", step S708 is not performed.

In step S708, the memory dump generating process of the kernel is performed in the dump domain. Since the process in step S708 is similar to that in step S621 in FIG. 9B, the description is omitted here.

In step S709, the PA-RA mapping unit 368 changes the mapping between the physical address (PA) and the real address (RA) of the domain 201-1 in the panic as described in 1) and 2) below. Thus, the data of the memory area used the kernel of the OS 401-1 at the panic is not overwritten although the OS 401-1 is restarted.

1) The physical address of the memory used by the kernel at the occurrence of the panic is not to be assigned to the real address of the domain to be restarted, and 2) The change of the memory size available in the domain is to be suppressed before and after the restart.

However, when the physical memory assignable to the domain to be restarted is smaller than a specified value, 1) above is prioritized.

In step S710, the OS restart instruction unit 358 directs the domain 201-1 to restart the OS 401-1 to make a restart. The OS restart instruction unit 358 includes the memory dump generating process of the kernel using the memory DR function in the restart direction when the kernel dump flag is "2 indicating that the dump is extracted using the memory dynamic reconfiguration function". The OS starting unit 409-1 restarts the OS 401-1 without writing the dump of the memory used by the kernel.

In step S711, the OS 401-1 resumes the task.

In step S712, the memory dump generating process of the kernel is performed. Since the process in step S712 is similar to that in step S624 described above, the description is omitted here.

In the memory dump generating process according to the third embodiment, when an error is detected and an operating system is put into emergency shut down (panic), no copying process is performed to another memory unit etc. although the memory dump is large in size, thereby enabling the operating system to be quickly restarted. Thus, the task may be stopped in a shorter time.

(Fourth Embodiment)

In the fourth embodiment, an error is detected in the operating system, and a memory dump of the kernel is extracted, and the memory dump of the hypervisor being operated is extracted (referred to as a live dump of a hypervisor).

Described below is the case in which a memory dump of the kernel of the OS 401-1 is generated.

Figure 18B:
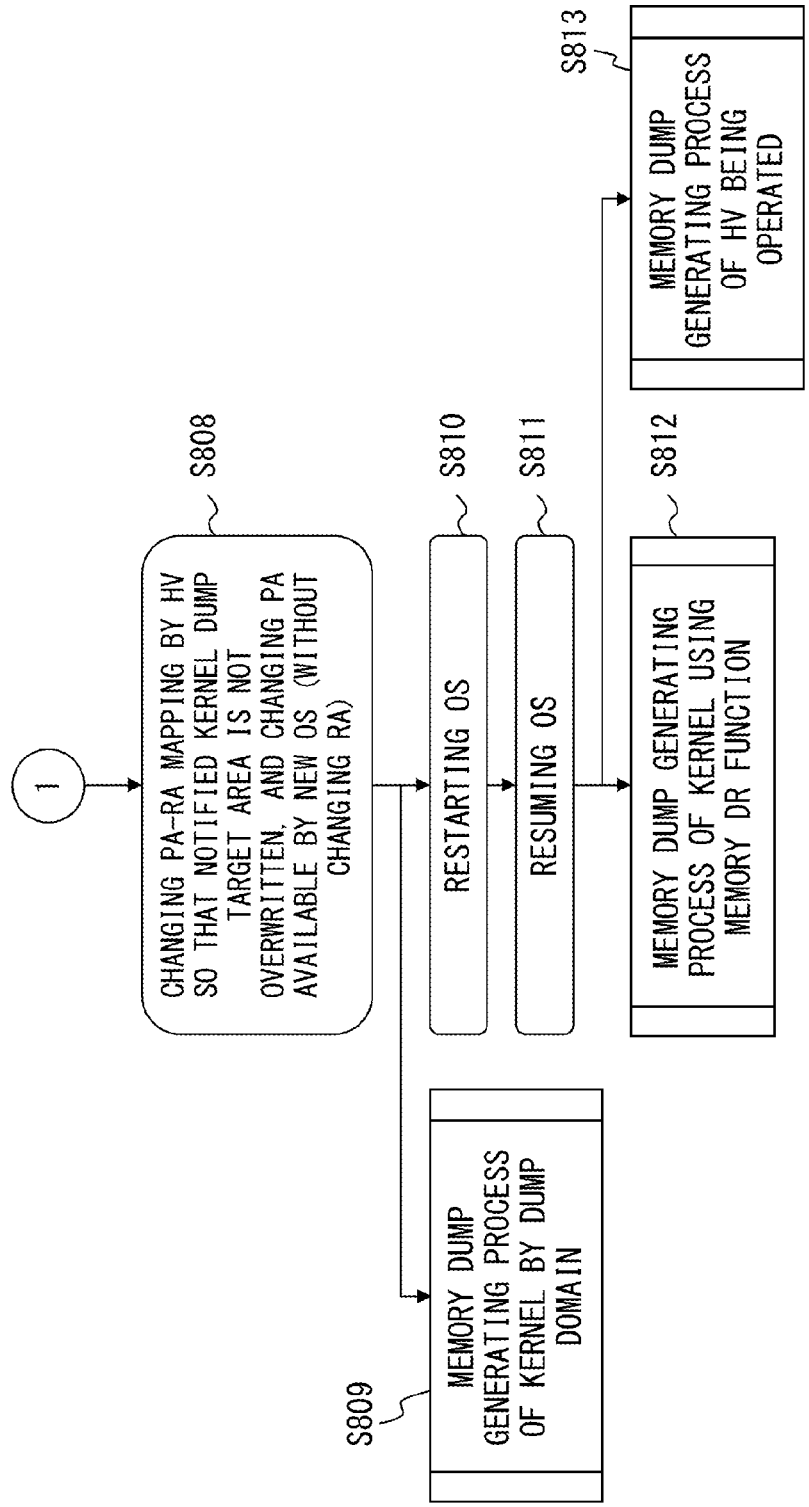
FIG. 18B is a flowchart of the memory dump generating process according to the fourth embodiment.

FIGS. 18A and 18B are flowcharts of the memory dump generating process according to the fourth embodiment.

Since steps S801 through S811 are similar to steps S701 through S711 in FIG. 17, the detailed description is omitted here.

Steps S812 and S813 are performed in parallel.

In step S812, the memory dump generating process of the kernel is performed. Since the process in step S812 is similar to the process in step S625, the detailed description is omitted here.

In step S813, the memory dump generating process of the hypervisor 351 being operated is performed in the control domain 204-1.

The memory dump generating process of the hypervisor 351 being operated is described below in detail.

Figure 19:
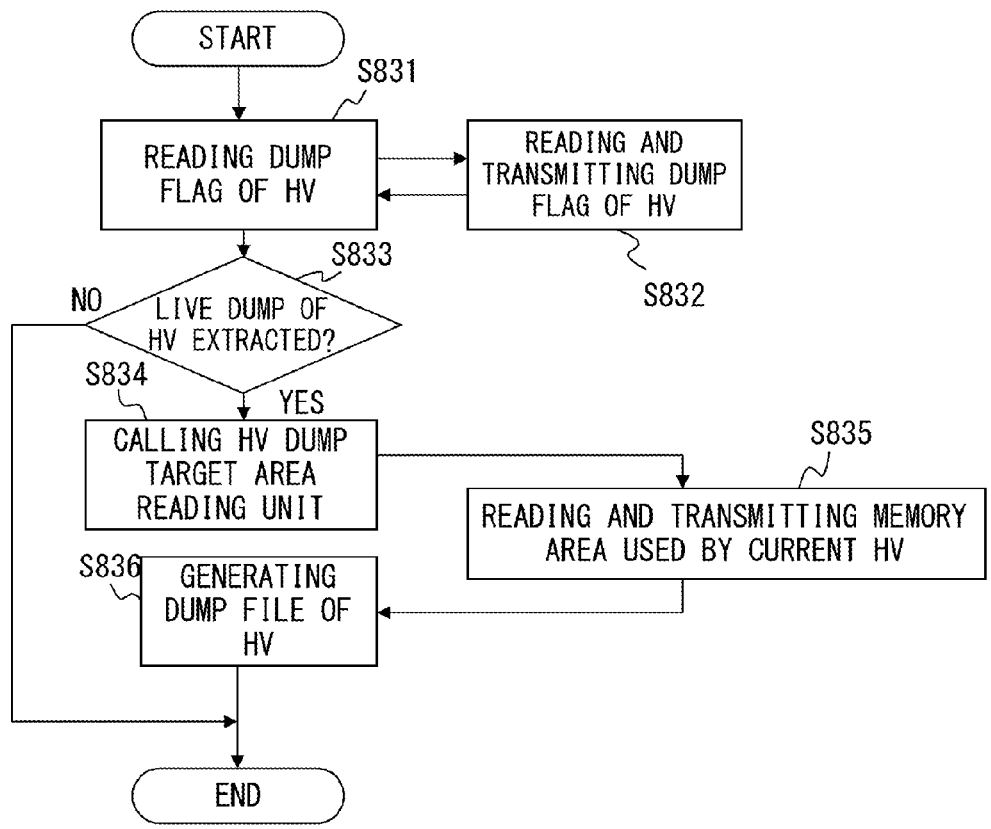
FIG. 19 is a flowchart of the memory dump generating process of the hypervisor which is being operated.

FIG. 19 is a flowchart of the memory dump generating process of the hypervisor which is being operated.

FIG. 19 corresponds to step S813 in FIG. 18B.

In the fourth embodiment, for example, the data structure of the HV dump flag may be changed into: 0 indicating no extraction; 1 indicating the HV dump in an abnormal condition; and 2 indicating the HV live dump. The HV memory dump judgment unit 408-1 judges that the live dump of the HV is not extracted when the HV dump flag is 0 or 1, and judges that the live dump of the HV is extracted.

In step S831, the HV memory dump judgment unit 408-1 requests the hypervisor 351 to transmit the HV dump flag.

In step S832, upon receipt of the request, the HV memory dump flag read and transmission unit 359 reads the HV dump flag from the HV dump target area information/HV dump flag storage area 356, and transmits it to the OS 401-1.

In step S833, the HV memory dump judgment unit 408-1 judges, based on the received HV dump flag, whether or not the live dump of the hypervisor 351 being operated is to be extracted. If it is judged that the live dump of the hypervisor 351 being operated is to be extracted, control is passed to step S834. If it is judged that the dump is not to be extracted, process terminates.

In step S834, the calling unit 410-1 of the HV dump target area reading unit calls the HV dump target area reading unit 360.

In step S835, the HV dump target area reading unit 360 reads the memory area being used by the hypervisor 351, and transmits the read memory contents to the disc 204-1.

In step S836, the HV dump unit 412-1 receives the memory contents, writes the received memory contents to a file, and generates a dump file of the hypervisor.

As described above, in the memory dump generating process of the hypervisor being operated, the data of the memory area used by the hypervisor is read without stopping or restarting the hypervisor, and the data is written as a dump file of the hypervisor to a file.

In the memory dump generating process according to the fourth embodiment, when an error is detected and an operating system is restarted, no copying process is performed to another memory unit etc. although the memory dump is large in size, thereby enabling the operating system to be quickly restarted. Thus, the task may be stopped in a shorter time.

In the memory dump generating process according to the fourth embodiment, an error caused by both of a hypervisor and a domain may be effectively analyzed by dumping memory of the hypervisor and the kernel.

A plurality of embodiments have been described above, but the embodiments of the present invention are not limited to a device and a method. That is, they may be configured as a program and a computer-readable recording medium which stores the program. The recording medium may be, for example, a flexible disk (FD), a hard disk drive, an optical disk, a magneto optical disk, CD-ROM, CD-R, DVD-ROM, DVD-RAM, a magnetic tape, a non-volatile memory card, etc.

For example, the program according to the embodiments of the present invention is read from the recording medium which stores the program, and stored in the memory 13 or 23, or non-volatile memory 14. The CPU 12 or 22 reads the program from the non-volatile memory 14 and executes the program, thereby performing various processes according to the embodiments above.

The present invention is not limited to the embodiments above, but may be real address in various configurations within the scope of the gist of the present invention. For example, the number of logical domains is not limited to four, but may be an arbitrary number.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a memory;
a processor which operates a virtual machine, an operating system which is executed on the virtual machine, and a hypervisor which controls the virtual machine by executing a program stored on the memory; and
a control unit which controls a system including the memory and the processor, wherein the processor
stops the operating system when detecting an error of the hypervisor;
notifies the control unit of a first memory area used by the hypervisor;
stops the hypervisor;

changes a memory area used by the hypervisor into a second memory area different from the first memory area notified by the control unit;

starts the hypervisor using the second memory area as an available area;

starts the operating system, and resumes an application program which is operated on the operating system; and reads data in the first memory area, and writes the data to a file as a dump file of the hypervisor.

2. The device according to claim 1, wherein the processor further changes a memory area used by the operating system which stops after starting the hypervisor using the second memory area as an available area into a fourth memory area different from a third memory area used by a kernel of the operating system;

starts the stopped operating system using the fourth memory area as an available area; and reads data of the third memory area and writes the data to a file as a dump file of the operating system.

3. The device according to claim 1, wherein the processor notifies the control unit of the first memory area as a dump target area when detecting an error of the hypervisor.

4. The device according to claim 1, wherein:

after stopping the hypervisor, a memory area used by the hypervisor is changed into the second memory area while holding the contents on the first memory area, and after initializing at latest the second memory area, the hypervisor is started.

5. The device according to claim 1, further comprising flag information indicating whether or not an area used by the hypervisor is to be dumped, wherein when the flag information indicates that the area used by the hypervisor is to be duped, the data of the first memory area is read, and the data is written to a file as a dump file of the hypervisor.

6. The device according to claim 5, wherein another virtual machine is further operated to read data of the first memory area according to the flag information, and write the data to a file as a dump file of the hypervisor.

7. The device according to claim 6, wherein after writing the data to a file as a dump file of the hypervisor, the flag information is initialized.

8. The device according to claim 1, wherein after writing the data to a file as a dump file of the hypervisor, the first memory area is released as a resource.

9. An information processing device, comprising:

a memory; and a processor which executes a virtual machine and an operating system which operates on the virtual machine, wherein the processor stops the operating system, which operates on the virtual machine and in which an error is detected, when the processor detect the error;

changes a memory area used by the stopped operating system into a second memory area different from a first memory area used by a kernel of the stopped operating system;

starts the stopped operating system and resumes an application program which operates on the operating system using the second memory area as an available area;

reads data of the first memory area and writes the data to a file as a dump file of the operating system; and reads, while a hypervisor is controlling the virtual machine, data of a memory area used by the hypervisor which controls the virtual machine, and writes the data to a file as a dump file of the hypervisor.

10. The device according to claim 9, wherein the data of the memory area used by the hypervisor is read without the hypervisor stopping the controlling of the virtual machine.

11. The device according to claim 9, wherein the processor attaches the first memory area in the operating system after the stopped operating system is started.

12. An information processing device, comprising:

a plurality of physical partitions each of which includes memory and a processor which operates a virtual machine and an operating system operating on the virtual machine by executing a program stored on the memory; and a control unit which controls the plurality of physical partitions, wherein the processor included in each of the physical partitions stops the operating system when an error of the hypervisor is detected;

notifies the control unit of a first memory area used by the hypervisor;

stops the hypervisor;

changes a memory area used by the hypervisor into a second memory area different from the first memory area notified to the control unit;

starts the hypervisor using the second memory area as an available area;

starts the operating system and resumes an application program which is operated on the operating system; and reads data of the first memory area and writes the data to a file as a dump file of the hypervisor.

13. The device according to claim 12, wherein:

each of the physical partitions operates a plurality of virtual machines;

the processor included in each of the physical partitions stops the operating system which operates in each of the plurality of virtual machines when an error of the hypervisor is detected;

notifies the control unit of the first memory area;

stops the hypervisor;

changes a memory area used by the hypervisor into a second memory area different from the first memory area notified to the control unit;

after starting the hypervisor using the second memory area as an available area, changes a memory area used by each of the plurality of stopped operating systems into a plurality of fourth memory areas which are different from a plurality of third memory areas used by each kernel of the plurality of stopped operating systems and do not overlap one another;

starts each of the stopped operating systems corresponding to each available area using each of the plurality of fourth memory areas as an available area, and resumes an application program which operates on each started operating system; and reads each piece of data of the plurality of third memory areas, and writes the data to a file as a dump file of the plurality of operating systems.

14. A memory dump method adopted by an information processing device including a memory, a processor which operates a virtual machine, an operating system which is executed on the virtual machine, and a hypervisor which controls the virtual machine, and a control unit which controls a system including the memory and the processor, the method comprising:

stopping the operating system when detecting an error of the hypervisor;
notifying the control unit of a first memory area used by the hypervisor;
stopping the hypervisor;
changing a memory area used by the hypervisor into a second memory area different from the first memory area notified by the control unit;
starting the hypervisor using the second memory area as an available area;
starting the operating system, and resuming an application program which is operated on the operating system; and
reading data in the first memory area, and writing the data to a file as a dump file of the hypervisor.

15. A non-transitory computer-readable recording medium which stores a memory dump program used to direct a computer including a memory, a processor which operates a virtual machine, an operating system which is executed on the virtual machine, and a hypervisor which controls the virtual machine, and a control unit which controls a system including the memory and the processor to perform a process, the process comprising:
stopping the operating system when detecting an error of the hypervisor;
notifying the control unit of a first memory area used by the hypervisor;
stopping the hypervisor;
changing a memory area used by the hypervisor into a second memory area different from the first memory area notified by the control unit;
starting the hypervisor using the second memory area as an available area;
starting the operating system, and resuming an application program which is operated on the operating system; and
reading data in the first memory area, and writing the data to a file as a dump file of the hypervisor.

* * * * *